United States Patent
Tokunaka et al.

(10) Patent No.: US 6,614,985 B1
(45) Date of Patent: Sep. 2, 2003

(54) APPARATUS FOR AND METHOD OF PROCESSING INFORMATION, INFORMATION PROCESSING SYSTEM, TERMINAL FOR AND METHOD OF RECEIVING DATA, AND DATA BROADCASTING SYSTEM

(75) Inventors: Teruhisa Tokunaka, Tokyo (JP); Eiji Kawai, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/364,633

(22) Filed: Jul. 30, 1999

(30) Foreign Application Priority Data

Jul. 31, 1998 (JP) .......................... 10-218294

(51) Int. Cl.[7] .............. H04N 5/91; H04N 7/00
(52) U.S. Cl. ........................... 386/46; 386/83
(58) Field of Search .............. 386/83, 46–52, 386/4; 725/67, 68, 86, 87, 101, 102; 360/32; H04N 5/91, 7/00

(56) References Cited

U.S. PATENT DOCUMENTS 4,879,611 A * 11/1989 Fukui et al.
5,526,127 A * 6/1996 Yonetani et al.
5,675,524 A    10/1997 Bernard

FOREIGN PATENT DOCUMENTS

WO    WO 95 12168    3/1995

OTHER PUBLICATIONS

"Sony to Develop 'Personal Digital Assistants'"PSG News, Feb. 23, 1998. pp. 1–1, XP002120248.

* cited by examiner

*Primary Examiner*—Robert Chevalier
(74) *Attorney, Agent, or Firm*—Frommer Lawrence & Haug LLP; William S. Frommer; Hans R. Mahr

(57) ABSTRACT

An information processing apparatus is capable of sending and receiving a large amount of data while maintaining real-timeness of the data. The information processing apparatus includes a CPU for performing functions as an ID selector for outputting identification information under a condition reached as a program recorded in a package medium is executed, a comparator for comparing an ID added to transmitted data which has been broadcast with an ID outputted by the ID selector, and a data selector for selectively receiving data based on a compared result from the comparator.

29 Claims, 15 Drawing Sheets

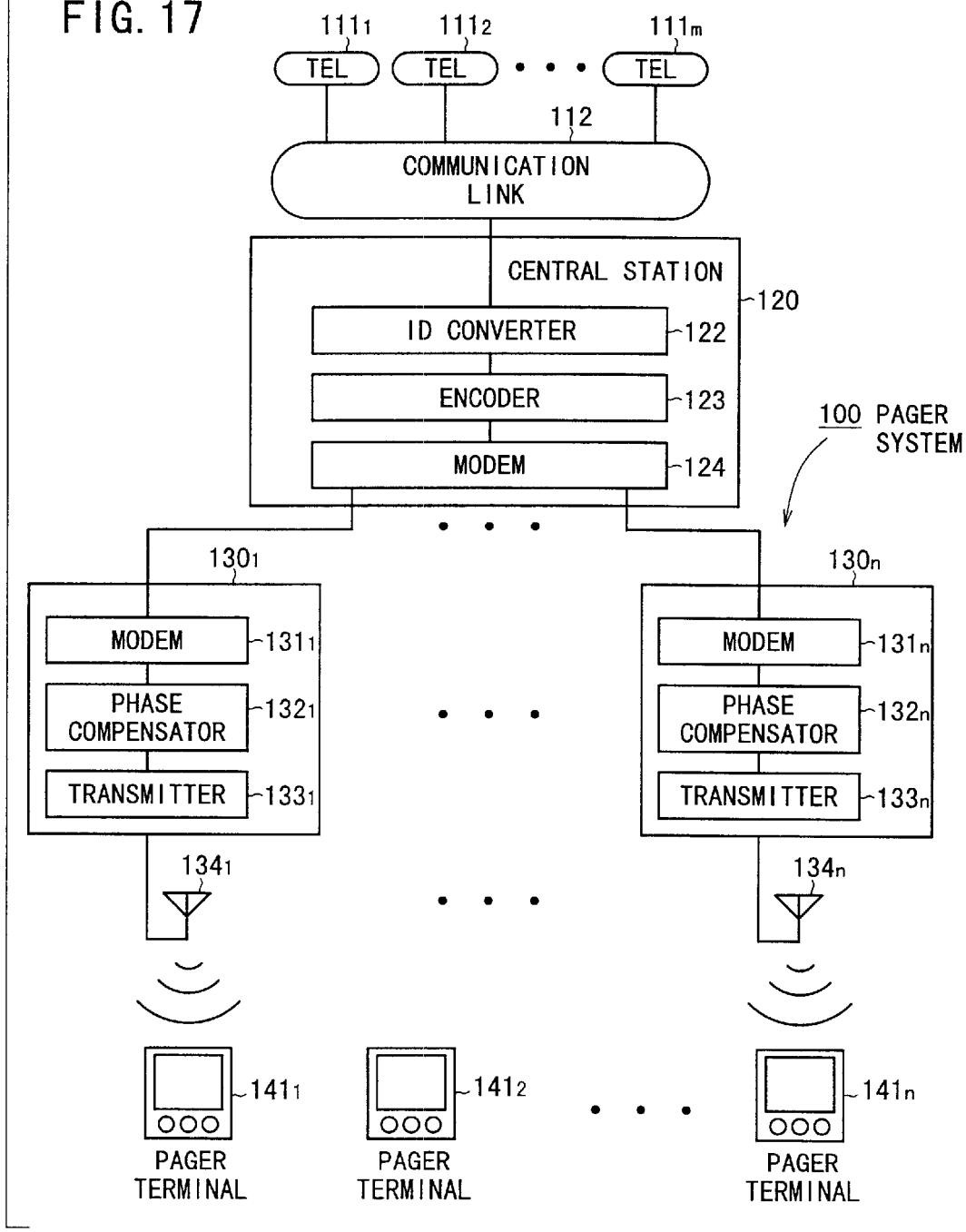

APPARATUS FOR AND METHOD OF PROCESSING INFORMATION, INFORMATION PROCESSING SYSTEM, TERMINAL FOR AND METHOD OF RECEIVING DATA, AND DATA BROADCASTING SYSTEM

BACKGROUND OF THE INVENTION

1. Field of the Invention

The present invention relates to an apparatus for and a method of processing information, an information processing system, a terminal for and a method of receiving data, and a data broadcasting system for sending and receiving data.

2. Description of the Related Art

There have heretofore been proposed systems for loading software contents in a hardware terminal and using the loaded software.

Such proposed systems include reproducing devices for playing back compact disks (CDs), analog records, mini disks (MDs), digital audio tapes (DATs), cassette tapes, and video tapes, and reproducing systems such as TV game machines and portable game machines for loading package mediums as contents in terminals and playing back those package mediums to play games.

There have also been proposed recording/reproducing systems as a combination of a reproducing system and a recording function. Such recording/reproducing systems include recording/reproducing devices for MDs and DATs, hardware terminals with an added recording function for loading package mediums in a terminal unit and recording information in and reproducing information from those package mediums, such as cassette decks, video decks, radio and cassette deck combinations, mini component stereo sets, TV sets with built-in video decks, and video decks with built-in CS decoders, and recording/reproducing systems as a combination of a hardware terminal with a recording function and a function to receive contents distributed via radio and cable links.

TV systems, radio systems (FM and AM), CATV systems, CS systems, BS systems, pager systems, portable telephone systems, and PHSs (personal handyphone systems) distribute contents via radio and cable links. Terminals of these systems have reception systems for allowing users to view distributed contents substantially at the same time the contents are distributed.

There has been known a pager system for transmitting data with identification (ID) information simultaneously to a plurality of pager terminals via radio links. The pager terminals are also known as pagers or beepers.

In recent years, a broadcasting system which employ an existing pager system has been proposed.

FIG. 17 of the accompanying drawings shows a pager system. As shown in FIG. 17, the pager system comprises a plurality of telephone sets $111_1$ through $111_m$, a central station 120 connected to the telephone sets $111_1$ through $111_m$ through a communication link 112, a plurality of base stations $130_1$ through $130_n$ for processing data transmitted from the central station 120 into broadcast data, and a plurality of pager terminals $141_1$ through $141_n$ for receiving broadcast data from the base stations $130_1$ through $130_n$.

The central station 120 comprises an ID converter 122 for converting a call signal into the ID address of a pager terminal to be called, an encoder 123 for encoding converted ID address data, and a modem 124 for sending data to and receiving data from the base stations $130_1$ through $130_n$. The base stations $130_1$ through $130_n$ comprise respective modems $131_1$ through $131_n$ for sending data to and receiving data from the central station 120, respective phase compensators $132_1$ through $132_n$ for phase-compensating data supplied thereto, and respective transmitters $133_1$ through $133_n$ for processing phase-compensated data into modulated data to be transmitted via respective antennas $134_1$ through $134_n$ to the pager terminals $141_1$ through $141_n$.

In the pager system 100, each of the telephone sets $111_1$ through $111_m$ calls a desired pager terminal according to the following process:

When the sender dials a number to call the pager terminal from either one of the telephone sets $111_1$ through $111_m$ as push-button telephone sets, the number signal is sent to the central station 120.

In the central station 120, the ID converter 122 converts the number signal into the ID address of one of the pager terminals $141_1$ through $141_n$ which corresponds to the dialed number. The encoder 123 encodes the converted ID address data. The modem 124 then sends the encoded data to the base stations $130_1$ through $130_n$.

In the base stations $130_1$ through $130_n$, the modems $131_1$ through $131_n$ receive the data sent from the central station 120, and the phase compensators $132_1$ through $132_n$ phase-compensate the received data. The transmitters $133_1$ through $133_n$ process the phase-compensated data into modulated signals to be transmitted via the respective antennas $134_1$ through $134_n$ to the pager terminals $141_1$ through $141_n$.

The pager terminals $141_1$ through $141_n$ have respective ID addresses of their own. The pager terminals $141_1$ through $141_n$ receive the ID address from the base stations $130_1$ through $130_n$. If one of the pager terminals $141_1$ through $141_n$ determines that the received ID address and its own ID address agree with each other, then that pager terminal carries out a calling process, e.g., emits a beep signal.

The above process is a series of successive steps for calling a pager terminal in the pager system 100.

The systems for loading package mediums as contents in terminals to use the package mediums are capable of handling a large amount of data including image and sound data. However, the data thus handled by these systems lacks real-time information. Stated otherwise, the package mediums do not contain real-time information, and users need to go to stores to purchase package mediums as contents.

The systems in which contents are distributed via radio and cable links and received by the reception systems of the terminals to allow users to view distributed contents substantially at the same time the contents are distributed, are capable of handling real-time information. However, the amount of information that is sent and received is relatively small, and the distributed information is used at site only. The distribution of information requires a permanent facility, and the users are generally charged with a fixed subscription fee.

The hardware terminals with an added recording function for loading package mediums in a terminal unit and recording information in and reproducing information from those package mediums, and the recording/reproducing systems as a combination of a hardware terminal with a recording function and a function to receive contents distributed via radio and cable links, have an increased time shifting capability because they can record received contents distributed via radio and cable links. In these terminals and systems, however, received contents are basically used as new package mediums. The amount of information distributed via radio and cable links remains the same, and the real-timeness of the information is lost the instant it is distributed. The above terminals and systems also suffer the problems that the distribution of information requires a permanent facility, and the users are generally charged with a fixed subscription fee.

Sending data with the system shown in FIG. 17 is advantageous in that it uses an existing infrastructure.

SUMMARY OF THE INVENTION

It is therefore an object of the present invention to provide an apparatus for and a method of processing information, an information processing system, a terminal for and a method of receiving data, and a data broadcasting system for sending and receiving data, in order to be able to send and receive a large amount of data while maintaining real-timeness of the data.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 17 is a block diagram of a pager system.

DESCRIPTION OF THE PREFERRED EMBODIMENTS

According to a first embodiment of the present invention, the principles of the invention are applied to a broadcasting system for simultaneously sending data to a plurality of portable information communication terminals as information processing devices via radio links.

Figure 1:
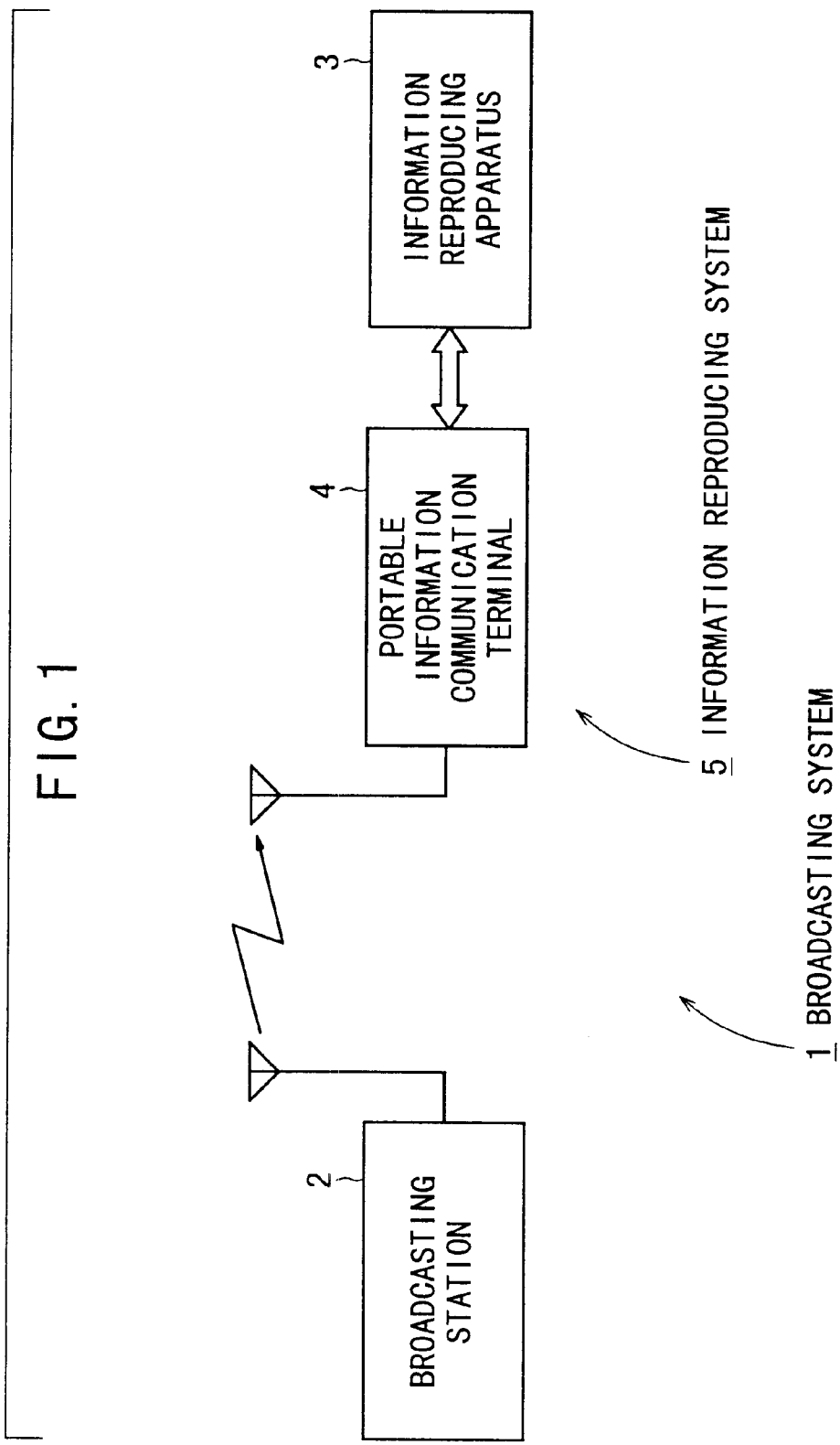
FIG. 1 is a block diagram of a broadcasting system according to a first embodiment of the present invention.

As shown in FIG. 1, a broadcasting system 1 comprises a broadcasting station 2 as a data broadcasting apparatus for broadcasting various data, and an information reproducing system 5 for receiving and reproducing data broadcast from the broadcasting station 2. The information reproducing system 5 comprises an information reproducing apparatus 3 for reproducing data recorded in a recording medium, and a portable information communication terminal 4 which is removably insertable into the information reproducing apparatus 3, for effecting data communications with the information reproducing apparatus 3.

Figure 2:
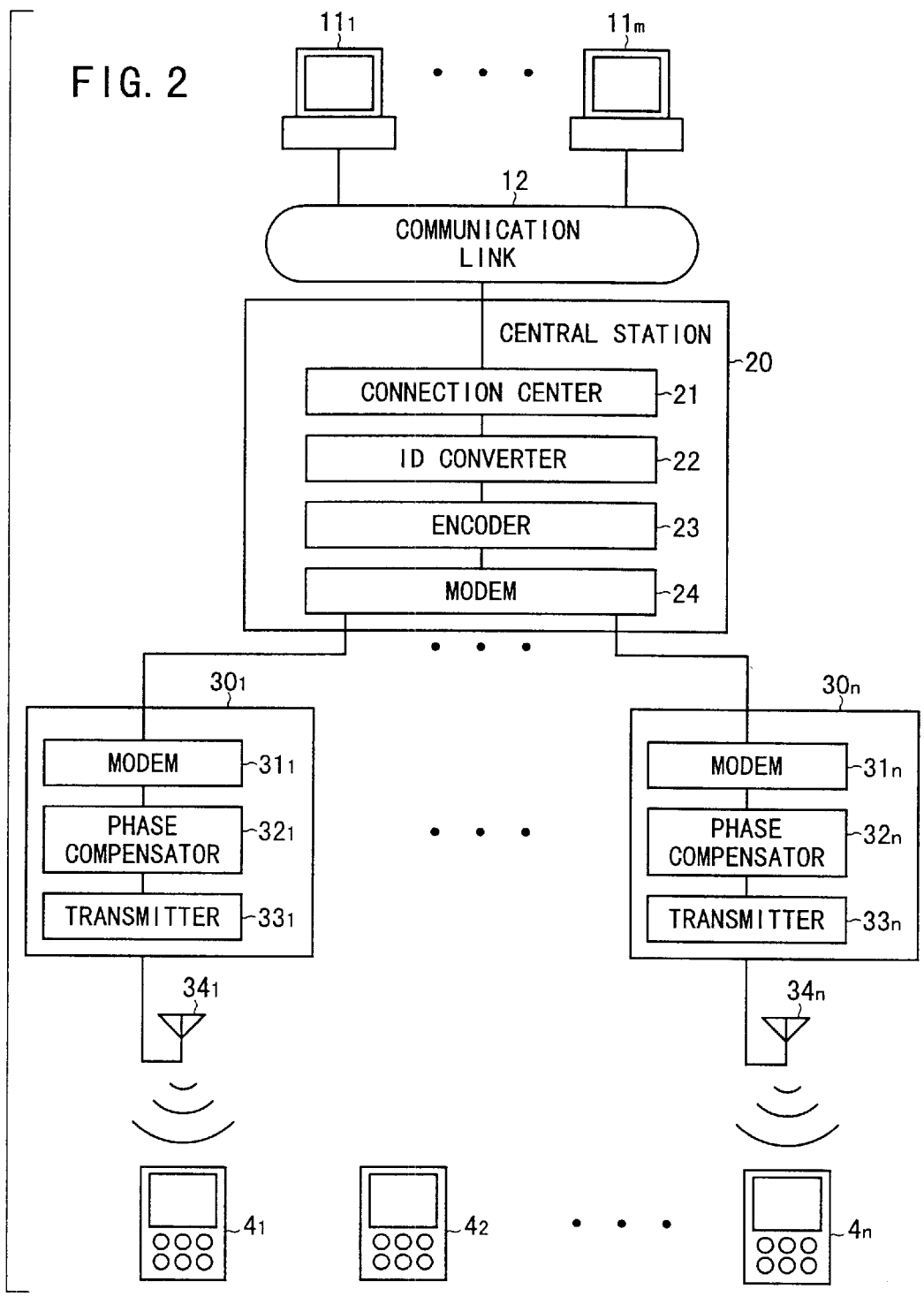
FIG. 2 is a block diagram of a specific arrangement of the broadcasting system shown in FIG. 1.

More specifically, as shown in FIG. 2, the broadcasting system 1 comprises a plurality of input devices $11_1$–$11_m$ connected to a communication link for being supplied with information from information providers, a central station 20 for processing, such as for ID conversion, data to which ID as identification information sent from the input devices $11_1$–$11_m$ is added, a communication link 12 interconnecting the input devices $11_1$–$11_m$ and the central station 20 for transmitting data between the input devices $11_1$–$11_m$ and the central station 20, a plurality of base stations $30_1$–$30_n$ for processing data from the central station 20 for transmission and transmitting the processed data from respective antennas $34_1$–$34_n$, and a plurality of portable information communication terminals $4_1$ through $4_n$ for receiving data sent from the antennas $34_1$–$34_n$ via a radio link. The central station 20 and the base stations $30_1$–$30_n$ jointly make up the broadcasting station 2 shown in FIG. 1.

Each of the input devices $11_1$–$11_m$ comprises a personal computer, for example, and is supplied with information in the form of text characters, for example. Dedicated software for entering, editing, and transmitting information is preinstalled in the input devices $11_1$–$11_m$.

The communication link 12 comprises a general analog circuit or a telephone network or a packet network such as an ISDN (Integrated Services Digital Network) or an OCN (Open Computer Network).

The central station 20 has a connection center 21, an ID converter 22, an encoder 23, and a modem 24.

The connection center 21 manages data sent from the input devices $11_1$–$11_m$. The connection center 21 serves as an identification information managing means for managing IDs added to data.

Specifically, the connection center 21 checks ID codes that are effect at present with respect to data, checks data for matching with a prepared distribution schedule, and also checks, if necessary, data contents for quality.

The ID converter 22 converts ID added as identification information to the data from the connection center 21 according to a predetermined process.

The encoder 23 encodes the data whose ID has been converted by the ID converter 22, according to a predetermined process.

The modem 24 receives the data encoded by the encoder 23, converts the encoded data to serial data according to a predetermined process, and transmits the converted data to base stations $30_1$–$30_n$.

The base stations $30_1$–$30_n$ have respective modems $30_1$–$30_n$, respective phase compensators $32_1$ through $32_n$, respective transmitters $33_1$ through $33_n$, and respective antennas $34_1$ through $34_n$. The base stations $30_1$–$30_n$ serve as a broadcast processing means for processing data with IDs added into data to be broadcast.

The modems $31_1$–$31_n$ receive data transmitted as serial data of a predetermined format from the modem 24 of the central station 20.

The phase compensators $32_1$ through $32_n$ phase-compensate data received by the modems $31_1$–$31_n$.

The transmitters $33_1$ through $33_n$ process, e.g., modulate, data phase-compensated by the phase compensators $32_1$ through $32_n$ into data to be sent from the antennas $34_1$ through $34_n$ via a radio link. Specifically, the transmitters $33_1$ through $33_n$ superpose sine waves shifted in phase for the respective base stations $30_1$–$30_n$ on the phase-compensated data to effect FSK modulation in order to apply a waveform offset to the phase-compensated data.

The antennas $34_1$–$34_n$ transmit processed signals from the base stations $30_1$–$30_n$ through the radio link.

The broadcasting station 2 thus constructed broadcast data with added IDs. The data that are broadcast by the broadcasting station 2 are data related to a game program that is run by the portable information communication terminals $4_1$ through $4_n$. To these data, there are added IDs that depend on status changes in the execution of the game program. Specifically, the execution of the game program represents the progress of a game that is played when the game program is executed, and the status changes represent the development of the game.

Figure 3:
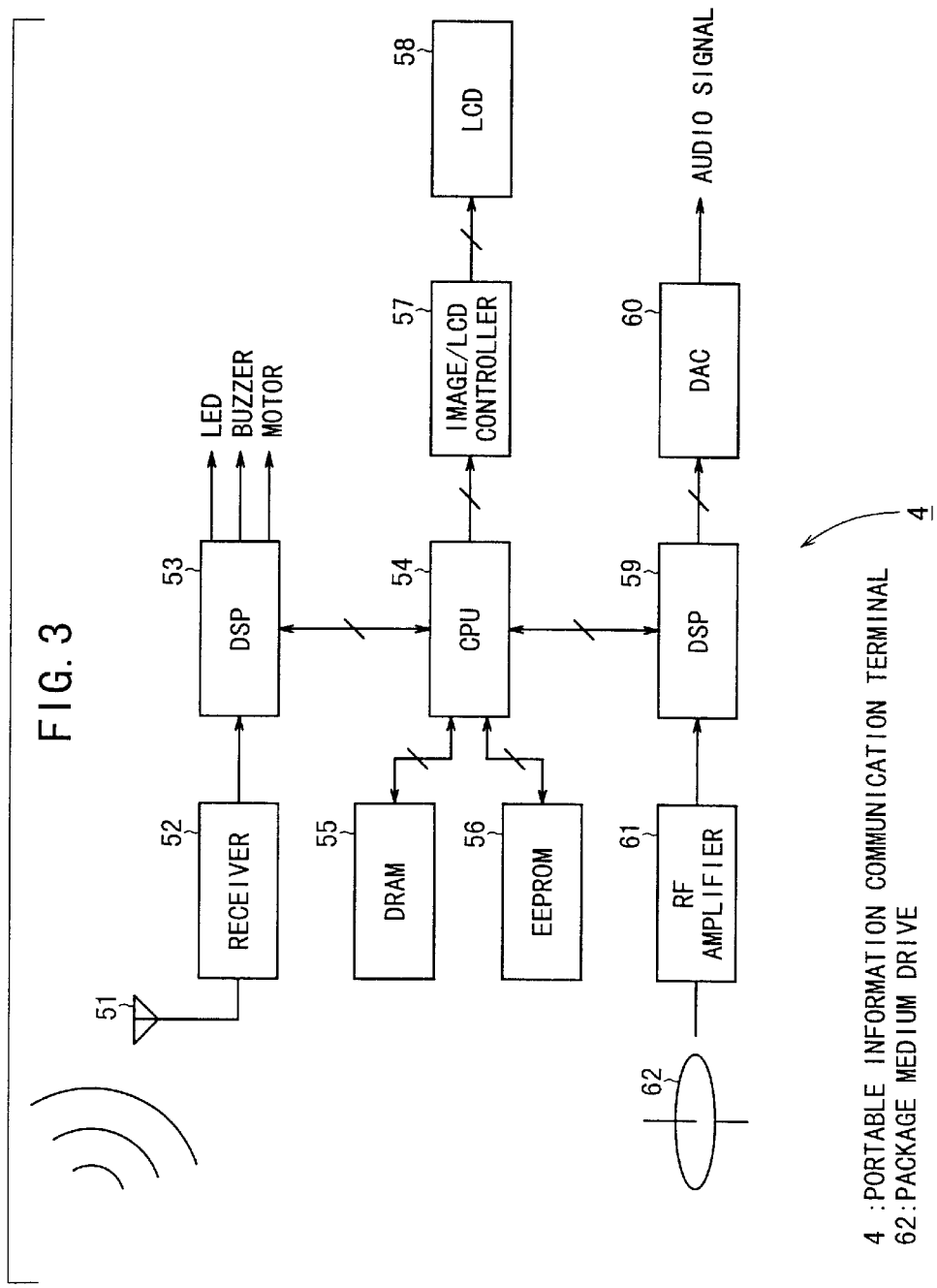
FIG. 3 is a block diagram of a portable information communication terminal of the broadcasting system shown in FIG. 1.

As shown in FIG. 3, each of the portable information communication terminals $4_1$ through $4_n$ (collectively denoted by the reference numeral 4 in FIG. 3) comprises an antenna 51, a receiver 52, a DSP 53, a main CPU 54, a DRAM 55, an EEPROM 56, an image/LCD controller 57, an LCD 58, a DSP 59, a DAC 60, an RF amplifier 61, and a package medium drive 62. Each of the portable information communication terminals $4_1$ through $4_n$ is arranged as a PDA (Personal Digital Assistant).

The antenna 51 detects and converts data transmitted through a radio link to an electric signal.

The receiver 52 selects a desired signal from the radio signal detected by the antenna 51, and processes, e.g., demodulates, the selected signal. The receiver 52 has a memory 52a (see FIG. 4) as a memory means for temporarily storing received data. For example, IDs are added to the received data.

The DSP 53 is a digital signal processor controlled by the main CPU 54 to process the signal from the receiver 52. The DSP 53 decodes encoded data from the receiver 52, for example. The DSP 53 outputs control signals for an LED, a buzzer, and a motor based on the digitally processed data.

The package medium drive 62 serves as a drive for driving a package medium such as an MD, for example. The package medium drive 62 has a drive unit for driving a package medium and a pickup unit for reading data from a package medium. For example, the package medium may comprise a recording medium in which a game program or an application program of educational software is recorded.

The RF amplifier 61 processes, e.g., amplifies and shapes the waveform of, an RF signal from the package medium drive 62.

The DSP 59 is a digital signal processor controlled by the main CPU 54 to process the signal from the RF amplifier 61. The DSP 59 decodes encoded data from the RF amplifier 61, for example.

The image/LCD controller 57 serves as a control unit for controlling the LCD 58 based on an image output signal from the main CPU 54.

The LCD 58 displays characters and images according to a control signal from the image/LCD controller 57.

The DAC 60 is a digital-to-analog converter for converting a digital audio signal decoded by the DSP 59 to an analog signal and outputting the analog signal as an audio signal.

The main CPU 54 is a central processing unit for controlling components of the hardware device, and executes a series of steps according to a predetermined sequence recorded in the EEPROM 56 which comprises a nonvolatile memory, for example. Data required for the process carried out by the main CPU 54 are temporarily stored in the DRAM 55 which comprises a volatile memory.

Figure 4:
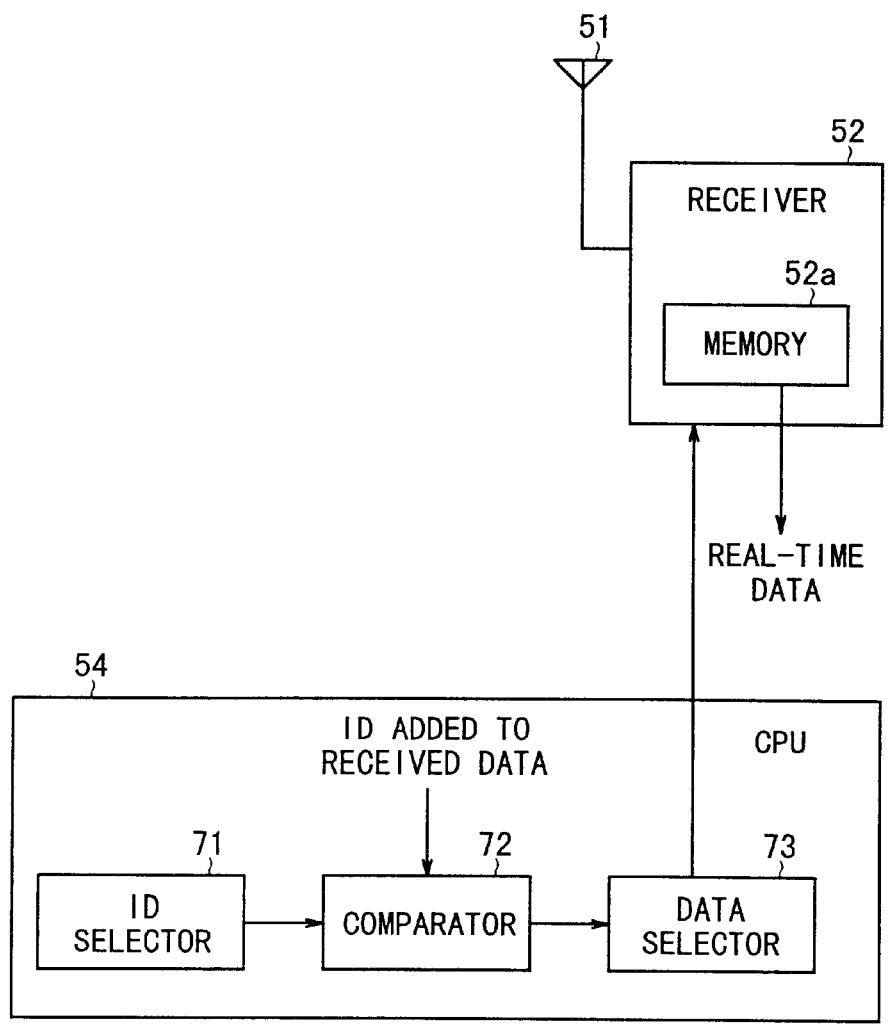
FIG. 4 is a block diagram of a specific arrangement of a CPU of the portable information communication terminal shown in FIG. 3.

Specifically, as shown in FIG. 4, the main CPU 54 has an ID selector 71 as identification information output means for outputting identification information under a condition reached as the program recorded in the package medium drive 62 is executed, a comparator 72 as a comparing means for comparing an ID added to transmitted data which has been broadcast with an ID outputted by the ID selector 71, and a data selector 73 as part of a selective reception means for selectively receiving data based on a compared result from the comparator 72.

The data selector 73 and the memory 52a of the receiver 52 jointly make up the selective reception means for selectively receiving data.

Specifically, the ID selector 71 outputs an ID by selecting one of IDs stored in the recording medium according to the program recorded therein, based on a condition reached as the program is executed. The selected ID is stored in the EEPROM 56 or a register in the main CPU 54 or the DSP 53.

If the program is a game program, then the condition reached as the program is executed represents a certain scene or achievement in a game played by the game program as it proceeds. In this case, therefore, selecting an ID based on a condition reached as the program is executed is equivalent to selecting an ID held by the program in association with the scene or achievement in the game, depending on the scene or achievement as the game proceeds.

In the main CPU 54, therefore, the comparator 72 compares an ID added to transmitted data with an ID outputted by the ID selector 71, and the data selector 73 selectively receives the data with the added ID from the memory 52a based on the compared result from the comparator 72. Thus, the main CPU 54 can selectively receive transmitted data corresponding to a condition reached as the program is executed. The data thus selected and received is stored in the EEPROM 56, for example.

An arrangement wherein various signals are outputted from the receiver 52 and the DSP 53 is the same as a conventional pager or FM receiver. An arrangement wherein an audio signal is outputted from the RF amplifier 61, the DSP 59, and the DAC 60 is the same as a conventional CD player, a playback-only MD player, or a DAT player.

The DSPs 53, 59 as signal processors in the system are controlled by the main CPU 54, to which are connected the DRAM 55 as a main memory, the EEPROM 56 for temporarily storing ID codes that are received and stored and real-time information, and the image/LCD controller 57 for displaying real-time information and images from a package medium. ID codes may be stored in registers in the CPU 54 and the DSPs 53, 59, rather than the EEPROM 56.

Figure 5:
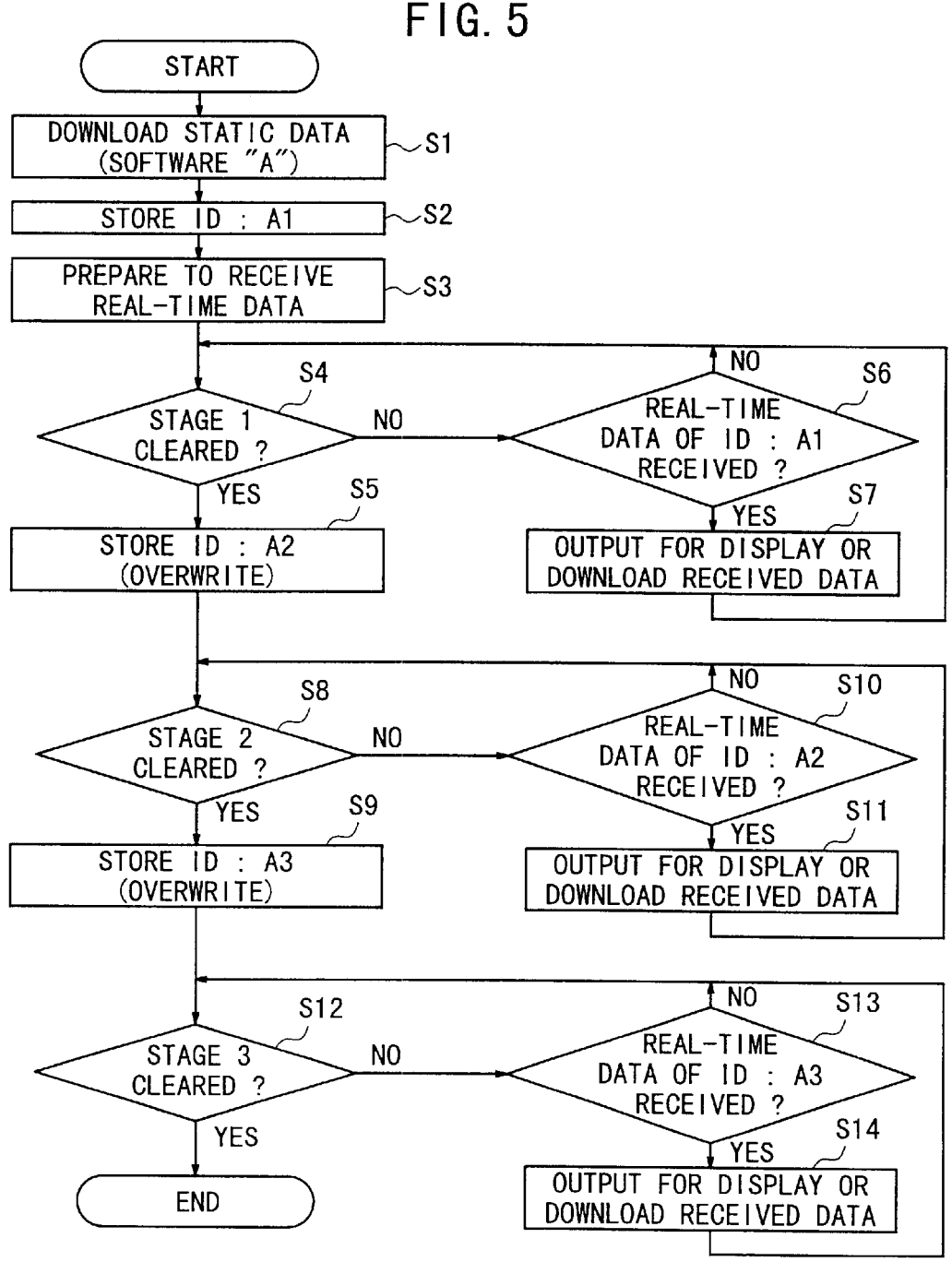
FIG. 5 is a flowchart of a processing sequence for obtaining new data according to IDs which the portable information communication terminal acquires as a game program proceeds.

FIG. 5 shows a processing sequence in which each of the portable information communication terminals $4_1$ through $4_n$ executes an application program recorded in a package medium, acquires IDs depending on scenes based on the application program, and selectively receives data based on the IDs.

The application program holds a plurality of IDs depending on the contents of the application program. The application program with IDs added depending on the contents thereof may be a game program for playing a video game in which scenes (stages) are changed depending on conditions, i.e., a role playing game or the like. The IDs are associated with the respective stages.

In the processing sequence shown in FIG. 5, the application program, i.e., software "A", holds three IDs depending on scenes (stages).

In step S1, the portable information communication terminal 4, which collectively represents the portable information communication terminals $4_1$ through $4_n$, downloads static data, i.e., the program A from the package medium.

Then, the portable information communication terminal 4 acquires an ID:A1 from the program A in step Ss2, and stores the acquired ID:A1 in the EEPROM 56 or the like.

In step S3, the portable information communication terminal 4 carries out a process in preparation for receiving real-time data. The real-time data are related data necessary in the execution of the application program. For example, using the real-time data, it is possible to execute the application program to proceed with the game. Therefore, the process in preparation for receiving real-time data is a process for receiving the related data.

In step S4, the portable information communication terminal 4 decides whether a first stage, i.e., stage 1, has been cleared or not. If stage 1 has been cleared, then control goes to step S5, and if stage 1 has not been cleared, then control goes to step S6.

In step S6, the portable information communication terminal 4 decides whether it has received real-time data corresponding to the ID:A1 or not. If the portable information communication terminal 4 has not received real-time data corresponding to the ID:A1, then control goes back to step S4. If the portable information communication terminal 4 has received real-time data corresponding to the ID:A1, then control goes to step S7.

In step S7, the portable information communication terminal 4 selectively receives real-time data corresponding to the ID:A1, and outputs for display or downloads the selectively received real-time data corresponding to the ID:A1 as received data. Specifically, the portable information communication terminal 4 reads real-time data temporarily stored in the memory 52a in the receiver 52.

In step S5 which follows step S4 if stage 1 has been cleared, the portable information communication terminal 4 stores an ID:A2. For example, the portable information communication terminal 4 stores a new ID by overwriting or addition.

With such a new ID acquired, the portable information communication terminal 4 has obtained the right to go to stage 2.

In steps S8 through S11, the portable information communication terminal 4 carries out a process which is the same as the process carried out for stage 1.

Specifically, in step S8, the portable information communication terminal 4 decides whether a second stage, i.e., stage 2, has been cleared or not. If stage 2 has been cleared, then control goes to step S9, and if stage 2 has not been cleared, then control goes to step S10.

In step S10, the portable information communication terminal 4 decides whether it has received real-time data corresponding to the ID:A2 or not. If the portable information communication terminal 4 has not received real-time data corresponding to the ID:A2, then control goes back to step S8. If the portable information communication terminal 4 has received real-time data corresponding to the ID:A2, then control goes to step S11.

In step S11, the portable information communication terminal 4 selectively receives real-time data corresponding to the ID:A2, and outputs for display or downloads the selectively received real-time data corresponding to the ID:A2 as received data. By downloading the real-time data, the portable information communication terminal 4 can perform a new process in the game program that is currently executed, i.e., reflect the real-time data in the game program.

In stage 2 has been cleared in step S8, the portable information communication terminal 4 stores an ID:A3, and obtains the right to proceed to stage 3.

In steps S12 through S14, the portable information communication terminal 4 carries out a process which is the same as the process carried out for stage 1 and stage 2.

Specifically, in step S12, the portable information communication terminal 4 decides whether a third stage, i.e., stage 3, has been cleared or not. If stage 3 has been cleared, then the portable information communication terminal 4 finishes the processing sequence according to the program A. If stage 3 has not been cleared, then control goes to step S13.

In step S13, the portable information communication terminal 4 decides whether it has received real-time data corresponding to the ID:A3 or not. If the portable information communication terminal 4 has not received real-time data corresponding to the ID:A3, then control goes back to step S12. If the portable information communication terminal 4 has received real-time data corresponding to the ID:A3, then control goes to step S14.

In step S14, the portable information communication terminal 4 selectively receives real-time data corresponding to the ID:A3, and outputs for display or downloads the selectively received real-time data corresponding to the ID:A3 as received data.

If stage 3 has been cleared in step S12, then the portable information communication terminal 4 finishes the processing sequence according to the program A.

According to the processing sequence shown in FIG. 5, the portable information communication terminal 4 receives new real-time data to go successively through stages depending on the progress of the software "A".

Therefore, IDs serve as keys for proceeding from stage to stage, and provide information such as of hints, keywords, points, or items.

The information reproducing apparatus 3 in which the portable information communication terminal 4 is removably insertable may be a video game apparatus, for example. The information reproducing apparatus 3 serves as a host unit for the portable information communication terminal 4. The information reproducing apparatus 3 and the portable information communication terminal 4 are capable of transmitting various items of information held thereby and various data such game programs therebetween.

In the broadcasting system 1, the portable information communication terminal 4 can receive real-time data corresponding to a condition reached as a program such as a game program is executed. Such real-time data reception by the portable information communication terminal 4 offers the following advantages:

The portable information communication terminal 4 can receive successive data insofar as they agree with IDs depending on the program which is executed. Therefore, the portable information communication terminal 4 can receive real-time data. The portable information communication terminal 4 can acquire received data even if a large amount of data is received.

Since the portable information communication terminal 4 can receive a plurality of real-time data in relation to the program executed by the portable information communication terminal 4, the program executed by the portable information communication terminal 4 is highly closely related to the data broadcast from the broadcasting station 2.

Furthermore, because the portable information communication terminal 4 obtains new information based on an achievement made by the user, the user feels highly involved in the contents, and finds the software to be a lot of fun. For example, the contents of the software may develop differently depending on how the user proceeds with the game. Specifically, if an application program of educational software is applied to the broadcasting system 1, then stages of the contents of the program can be changed depending on the learning status of the user.

If a greater number of stages for acquiring IDs as the program proceeds are provided, then the story made up of the contents of the program may be developed in a greater number of steps.

Though the portable information communication terminal 4 only receives data broadcast from the broadcasting station 2, since the portable information communication terminal 4 obtains real-time data depending on the contents which are under way, the broadcasting system 1 is highly interactive.

The author of the contents and the user of the portable information communication terminal 4 are closely related to each other. For example, the author can sent new contents that have been edited in view of reactions of the user.

The real-time data themselves can be expected to be available for many uses and to be detailed, making the software more attractive. For example, the data to be transmitted may be of different contents at different times though the same ID is added thereto.

Priority ranks can easily be applied to the production of real-time data. For example, while real-time data are being improved, real-time data can successively be transmitted.

Figure 6:
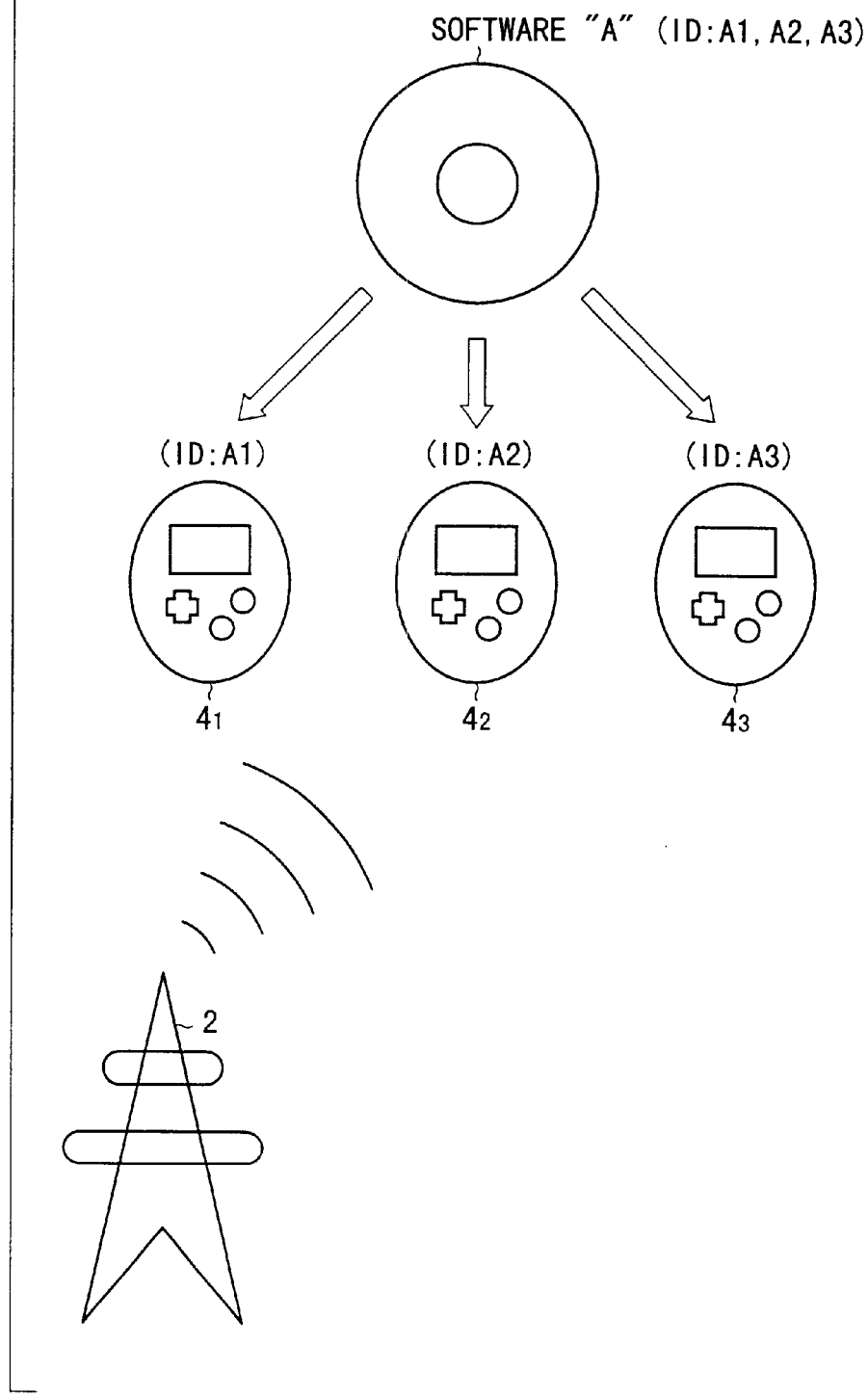
FIG. 6 is a diagram illustrating the manner in which one game program is executed by a plurality of portable information communication terminals.

Moreover, since real-time data with added IDs are data that are simultaneously broadcast to a plurality of people, the real-time data may be utilized as follows:

As shown in FIG. 6, portable information communication terminals 41, 42, 43 carried by respective three users can receive respective data from the broadcasting station 2.

Even if the portable information communication terminals 41, 42, 43 are loaded with the same software "A", it is unlikely for the software "A" to proceed at the same rate among the users because of different control actions, different progress rates, different frequencies of usage, and different periods of usage of those users. For example, when the user of the portable information communication terminal 41 is in stage 1, the user of the portable information communication terminal 42 may have cleared stage 1 and may be in stage 2, and the user of the portable information communication terminal 43 may have cleared stage 2 and may be in stage 3. In this situation, the ID:A1 is stored in the portable information communication terminal 41 in stage 1, the ID:A2 corresponding to stage 2 is stored in the portable information communication terminal 42 that has proceeded to stage 2, and the ID:A3 corresponding to stage 3 is stored in the portable information communication terminal 43 that has proceeded to stage 3.

In this manner, when the same program is executed by the different users, the story according to the program may proceed at different rates for the users depending on the progress of the program at the users.

The broadcasting station 2 can send real-time data related to the software "A", and can also send real-time data related to different software such as software "B", software "C", . . . . In this case, real-time data with ID:B1, ID:B2, ID:B3 added thereto are broadcast with respect to the software "B", and real-time data with ID:C1, ID;C2, ID:C3 added thereto are broadcast with respect to the software "C".

Figure 7:
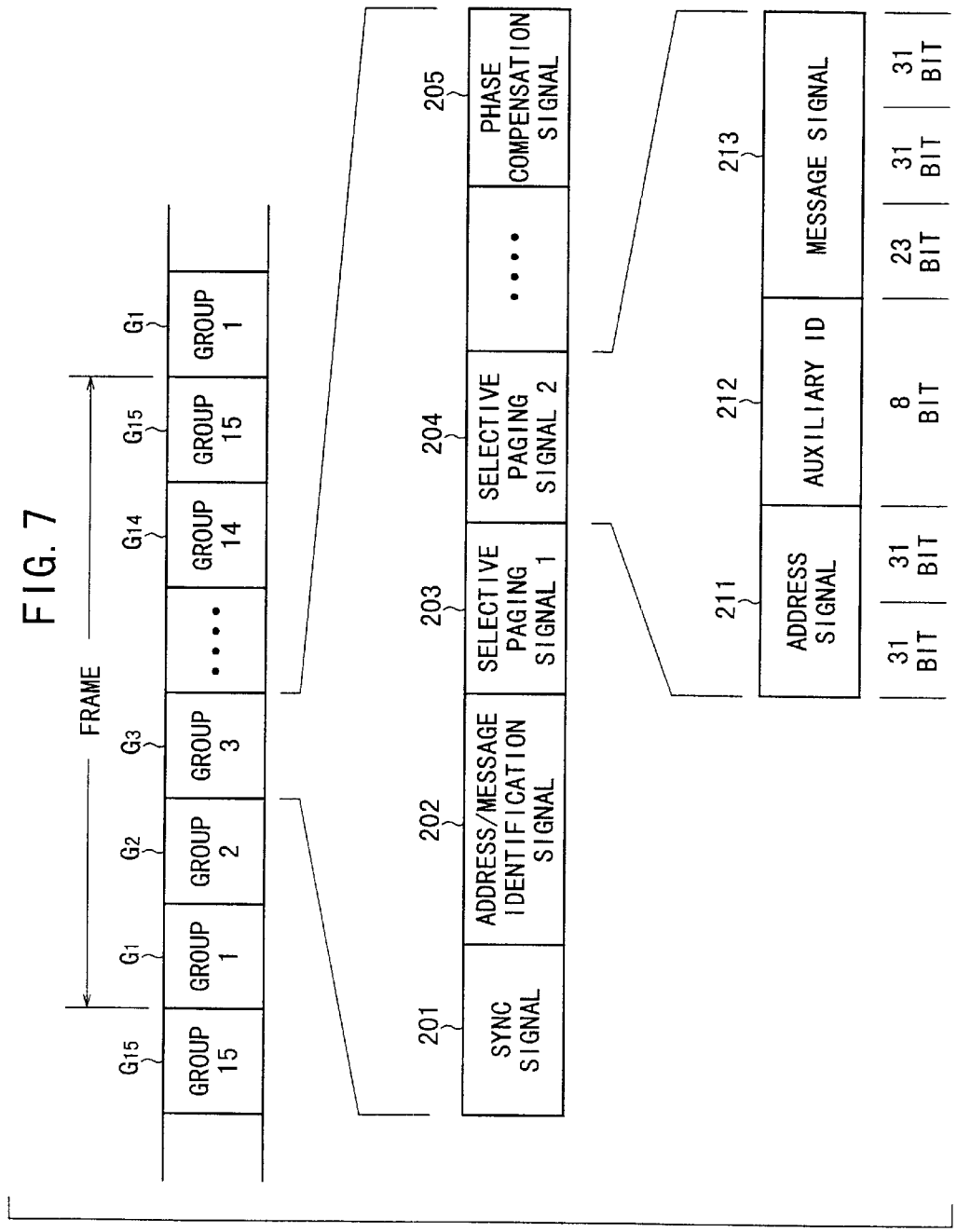
FIG. 7 is a diagram illustrating data sent in the broadcasting system and an ID added to the data.

FIG. 7 shows a data format used in the broadcasting system 1. The data format shown in FIG. 7 employs an NTT 1200 bps scheme for a radio pager system.

As shown in an upper portion of FIG. 7, the data format has a data transmission cycle as one frame which comprises 15 groups $G_1$, $G_2$, $G_3$, . . . , $G_{14}$, $G_{15}$ as data transmission units.

As shown in a middle portion of FIG. 7, each of the groups comprises a synchronizing signal 201, an address/message identification signal 202, selective paging signals 203, 204, and a phase compensation signal 205. The address/message identification signal 202 represents codes indicative of an arrangement of signals within each of the selective paging signals.

As shown in a lower portion of FIG. 7, each of the selective paging signals comprises an address signal 211, an auxiliary ID 212, and a message signal 213.

In the NTT 1200 bps scheme for a radio pager system, real-time data is stored in the message signal 213, and an ID as an identification signal is represented by the auxiliary ID 212.

In the broadcasting system 1, the data format for transmitting the above real-time data is not limited to the data format shown in FIG. 7, but may be a data format of a next generation.

In the first embodiment described above, the portable information communication terminal 4 has a recording medium, and executes a game program read from the recording medium. However, the portable information communication terminal 4 may download a game program from a communication link or may download a game program from the information reproducing apparatus 3.

According to a second embodiment of the present invention, the information reproducing system 5 in the broadcasting system 1 is constructed as a video entertainment system.

Figure 8:
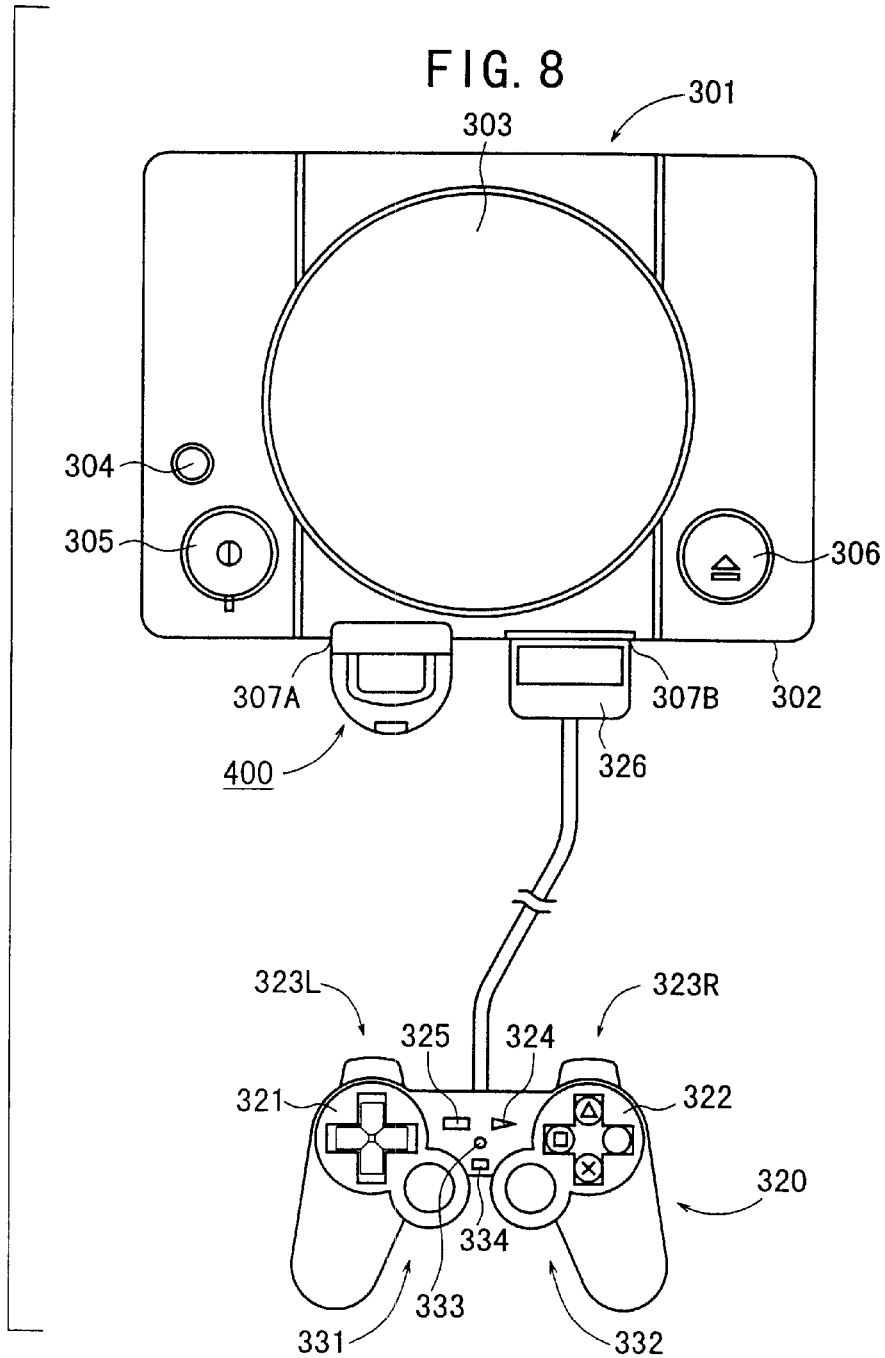
FIG. 8 a plan view of a video entertainment system according to a second embodiment of the present invention.
Figure 9:
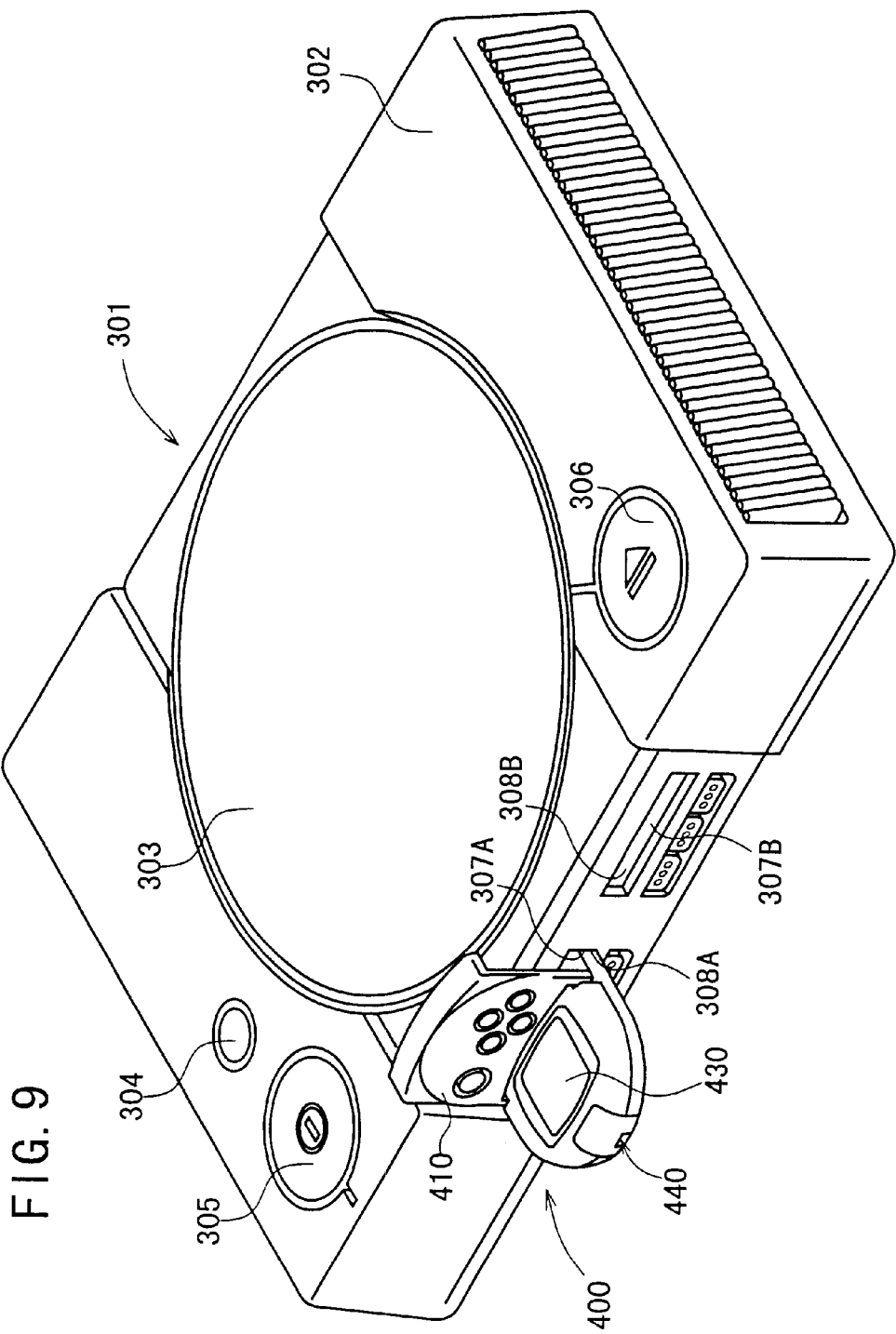
FIG. 9 is a perspective view of the video entertainment system shown in FIG. 8.

As shown in FIGS. 8 and 9, the video entertainment system comprises a video game apparatus 301 as a first data processing means and a portable electronic device 400 removably inserted in the video game apparatus 301 for data communication therewith, the portable electronic device 400 serving as a second data processing means and a data reception terminal. The video game apparatus 301 serves as a master unit, and the portable electronic device 400 as a slave unit. For example, the video game apparatus 301 is arranged as a means for executing a game program stored in a recording medium such as a CD-ROM, and the portable electronic device 400 as a means for receiving data transmitted by a broadcast.

Figure 10:
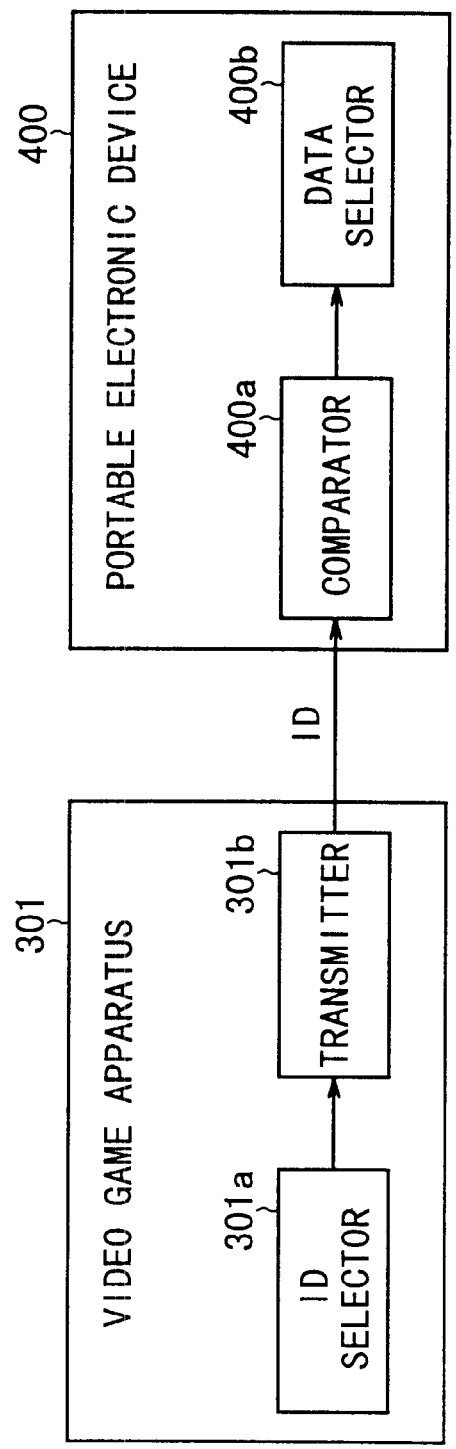
FIG. 10 is a block diagram of a video game apparatus and a portable electronic device of the video entertainment system shown in FIG. 8.

As shown in FIG. 10, the video game apparatus 301 serving as the first data processing means and also an information processing apparatus comprises an ID selector 301a as an identification information output means for outputting identification information under a condition reached as the program recorded in the recording medium is executed, and a transmitter 301b as a transmitting means for sending an ID which is identification information outputted from the ID selector 301a to the portable electronic device 400. The portable electronic device 400 as the second data processing means comprises a comparator 400a as a comparing means for comparing an ID which is identification information added to data transmitted by a broadcast with an ID transmitted from the video game apparatus 301, and a data selector 400b as part of a selective reception means for selectively receiving transmitted data based on a compared result from the comparator 400a. The video game apparatus 301 has the ID selector 301a as a function of a CPU, and the portable electronic device 400 has the comparator 400a and the data selector 400b as a function of a control means of a CPU or the like.

Specific details of the video entertainment system will be described below.

As shown in FIGS. 8 and 9, the video game apparatus 301 reads an application program from the recording medium, and executes the application program according to instructions from the user, i.e., the game player. For example, the video game apparatus 301 executes a game program mainly to proceed with a game, display game images, and output sounds.

The video game apparatus 301 has a rectangular casing 302 which houses a disk loading unit 303 substantially centrally therein for loading an optical disk such as a CD-ROM or the like as a recording medium for supplying an application program such as a game program or the like. The casing 302 supports a reset switch 304 for resetting a video game, a power supply switch 305, a disk control switch 306 for controlling the loading of the optical disk, and two slots 307A, 307B.

The video game apparatus 301 may be supplied with an application program via a communication link, rather than being supplied from the recording medium.

The portable electronic device 400 and a manual controller 320 can be connected to the slots 307A, 307B. A memory card system may also be connected to the slots 307A, 307B.

The manual controller 320 has first and second control pads 321, 322, a left button 323L, a right button 323R, a start button 324, a selector button 325, analog control pads 331, 332, a mode selector switch 333 for selecting control modes for the analog control pads 331, 332, and an indicator 334 for indicating a selected control mode. The manual controller 320 also has a vibration imparting mechanism (not shown) disposed therein for imparting vibrations to the manual controller 320 depending on how the video game proceeds. The manual controller 320 is electrically connected to the slot 307B in the casing 302 by a connector 326.

If two manual controllers 320 are connected respectively to the slots 307A, 307B, two users or game players can share the video entertainment system to play a competition game, for example. The video game apparatus 301 may have more or less than two slots 307A, 307B.

Figure 11:
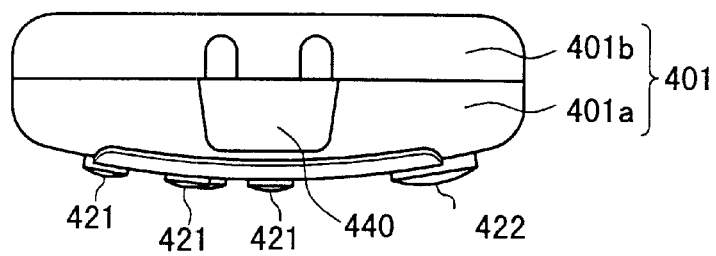
FIG. 11 is a plan view of the portable electronic device shown in FIG. 10.
Figure 12:
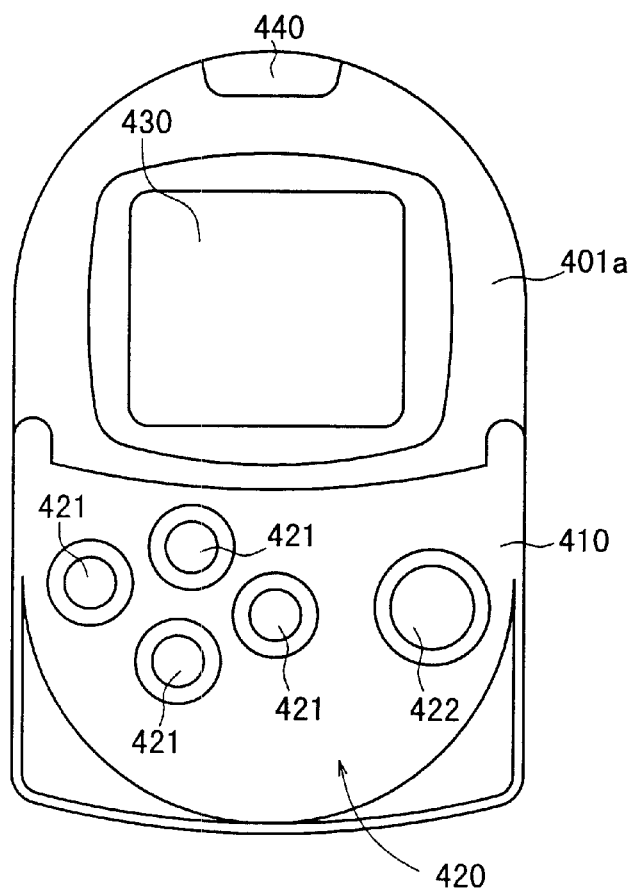
FIG. 12 is a front elevational view of the portable electronic device shown in FIG. 10.
Figure 13:
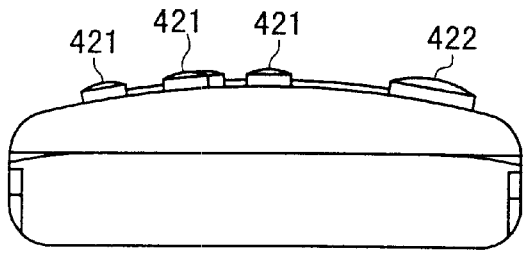
FIG. 13 is a bottom view of the portable electronic device shown in FIG. 10.

As shown in FIGS. 11, 12, and 13, the portable electronic device 400 has a housing 401 which supports a manual control pad 420 for entering various items of information, a display unit 430 such as a liquid crystal display (LCD) unit or the like, and a window 440 for allowing a wireless communication unit to perform wireless communication such as infrared communication.

The housing 401 comprises an upper shell 401a and a lower shell 401b, and houses a board which supports memory devices, etc. thereon. The housing 401 is shaped so as to be insertable into either one of the slots 307A, 307B in the casing 302.

The window 440 is mounted on a substantially semicircular end of the housing 401. The display unit 430 occupies a substantially half area of the upper shell 401a of the housing 401, and is positioned near the window 440.

The manual control pad 420 has a plurality of control buttons 421, 422 for entering events and making various selections. The manual control pad 420 occupies the other substantially half area of the upper shell 401a, and is positioned remotely from the window 440. The manual control pad 420 is disposed on a lid 410 that is angularly movably supported on the housing 401. The control buttons 421, 422 extend through the lid 410 from its upper surface to its lower surface. The control buttons 421, 422 are supported on the lid 410 for movement into and out of the upper surface of the lid 410.

The portable electronic device 400 has a board disposed in the housing 410 and facing the lid 410 as it is closed over the housing 401. The board supports a plurality of switch pressers held in alignment with the respective control buttons 421, 422 when the lid 410 is closed over the housing 401. When one of the control buttons 421, 422 is pressed by the user, it actuates the corresponding switch presser to press a pressure switch such as a diaphragm switch, for example.

As shown in FIG. 9, the portable electronic device 400 with the lid 410 being open is inserted into the slot 307A in the casing 302 of the video game apparatus 301.

The video game apparatus 301 and the portable electronic device 400 have respective appearances and structures as described above.

Figure 14:
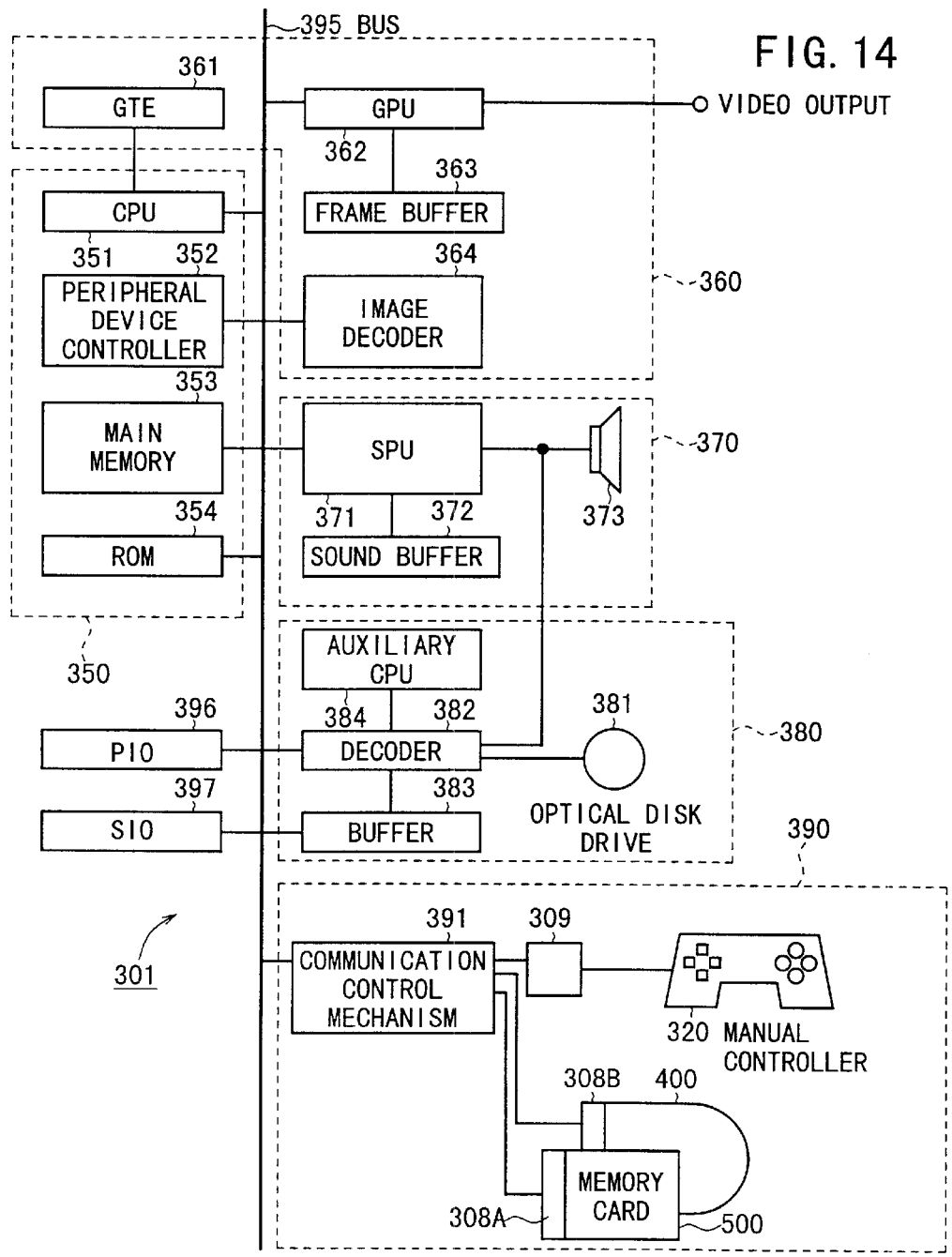
FIG. 14 is a block diagram of the video game apparatus shown in FIG. 10.
Figure 15:
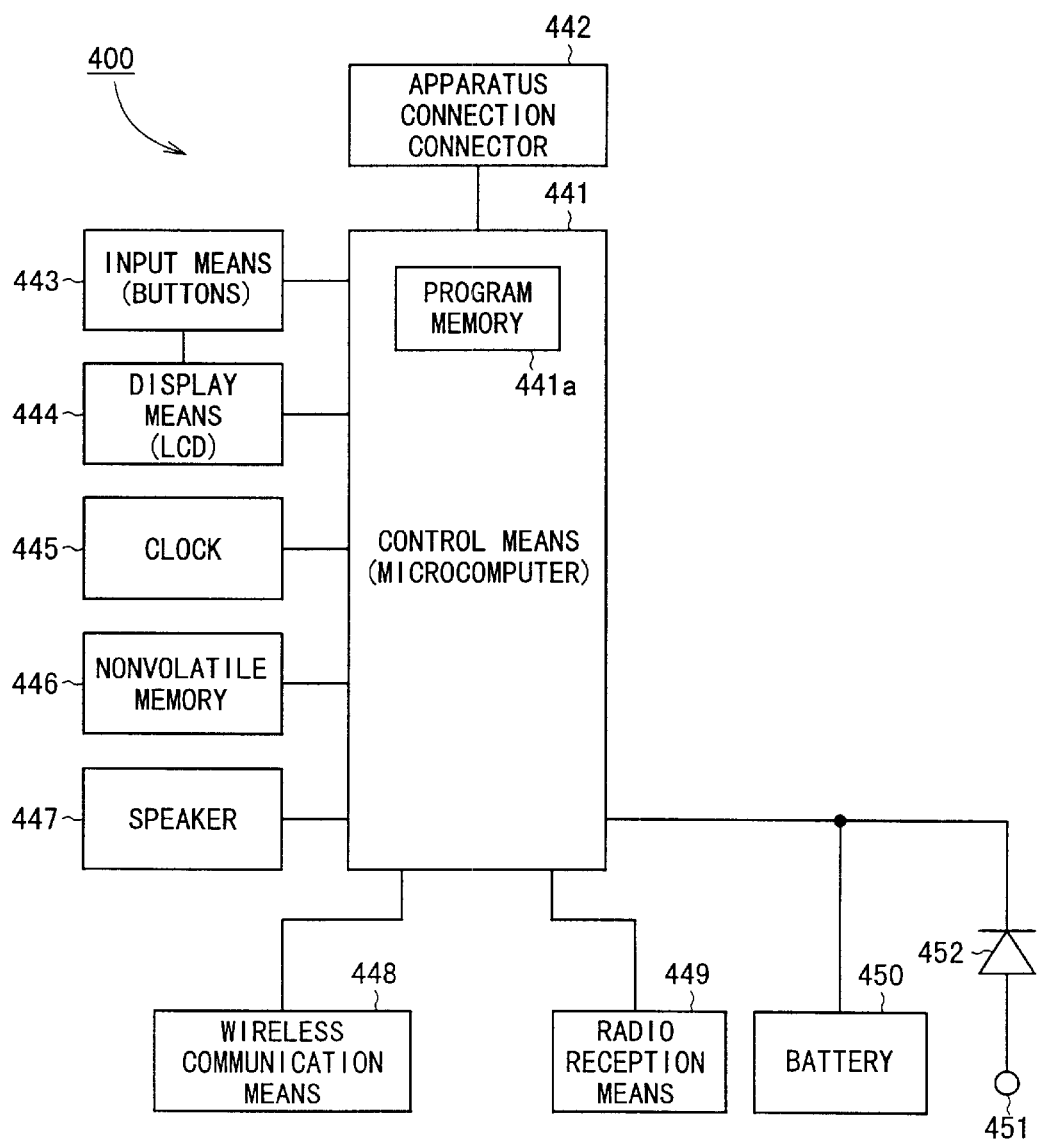
FIG. 15 is a block diagram of the portable electronic device shown in FIG. 10.

FIGS. 14 and 15 show circuit arrangements of the video game apparatus 301 and the portable electronic device 400.

As shown in FIG. 14, the video game apparatus 301 comprises a control system 350 including a central processing unit (CPU) 351 and its peripheral devices, a graphic system 360 including a graphic processing unit (GPU) 362 for plotting image data in a frame buffer 363, a sound system 370 including a sound processing unit (SPU) 371 for generating music sounds and sound effects, an optical disk controller 380 for controlling an optical disk in which application programs are recorded, a communication controller 390 for controlling signals from the manual controller 320 which enter instructions from the user, and data supplied to and from a memory card 500 which stores game settings and the portable electronic device 400, a bus 395 to which the control system 350, the graphic system 360, the sound system 370, the optical disk controller 380, and the communication controller 390 are connected, a parallel I/O interface (PIO) 396 and a serial I/O interface (SIO) 397 which interface another apparatus.

The control system 350 comprises a CPU 351, a peripheral device controller 352 for controlling direct memory access (DMA) data transfer, a main memory 353 comprising a random-access memory (RAM), and a read-only memory (ROM) 354 which stores various programs such as an operating system for managing the main memory 353, the graphic system 360, the sound system 370, etc.

The CPU 351 controls the video game apparatus 301 in its entirety by executing the operating system stored in the ROM 354.

When the video game apparatus 301 is turned on, the CPU 351 executes the operating system stored in the ROM 354 to start controlling the graphic system 360, the sound system 370, etc. For example, when the operating system is executed, the CPU 351 initializes the video game apparatus 301 in its entirety for confirming its operation, and thereafter controls the optical disc controller 380 to execute an application program recorded in the optical disk. As the application program is executed, the CPU 351 controls the graphic system 360, the sound system 370, etc. depending on instructions entered from the user for thereby controlling the display of images and the generation of music sounds and sound effects.

As shown in FIG. 10, the CPU 351 has the ID selector 301a for outputting an ID under a condition reached as the program is executed. Specifically, as with the first embodiment, IDs corresponding to conditions reached as the program is executed are held by the program. The ID selector 301a selects one of the IDs thus held by the program depending on the progress of the program.

The graphic system 360 comprises a geometry transfer engine (GTE) 361 for performing coordinate transformations and other processing, a GPU 362 for plotting image data according to commands from the CPU 351, a frame buffer 363 for storing image data plotted by the GPU 362, and an image decoder 364 for decoding image data compressed and encoded by an orthogonal transform such as a discrete cosine transform.

The GTE 361 has a parallel arithmetic mechanism for performing a plurality of arithmetic operations parallel to each other, and can perform coordinate transformations, light source calculations, matrixes, or vectors at a high speed in response to a request from the CPU 351. Specifically, the GTE 361 can calculate the coordinates of a maximum of 1.5 million polygons per second for a flat shading process to plot one triangular polygon with one color, for example. With the GTE 361, the video game apparatus 301 is able to reduce the burden on the CPU 351 and perform highspeed coordinate calculations.

According to an image plotting command from the CPU 351, the GPU 362 plots a polygon or the like in the frame buffer 363. The GPU 362 is capable of plotting a maximum of 360 thousand polygons per second.

The frame buffer 363 comprises a dual-port RAM, and is capable of simultaneously storing image data plotted by the GPU 362 or image data transferred from the main memory 353, and reading image data for display. The frame buffer 363 has a storage capacity of 1 Mbytes, for example, and is handled as a 16-bit matrix made up of a horizontal row of 1024 pixels and a vertical column of 512 pixels.

The frame buffer 363 has a display area for storing image data to be outputted as video output data, a CLUT (color look-up table) area for storing a color look-up table which will be referred to by the GPU 362 when it plots a polygon or the like, and a texture area for storing texture data to be subjected to coordinate transformations when a polygon is plotted and mapped onto a polygon plotted by the GPU 362.

The CLUT area and the texture area are dynamically varied as the display area is varied.

The image decoder 364 is controlled by the CPU 351 to decode image data of a still or moving image stored in the main memory 353, and store the decoded image into the main memory 353. Image data reproduced by the image decoder 364 is transferred to the frame buffer 363 by the GPU 362, and can be used as a background for an image plotted by the GPU 362.

The sound system 370 comprises an SPU 371 for generating music sounds, sound effects, etc. based on commands from the CPU 351, a sound buffer 372 for storing waveform data from the SPU 371, and a speaker 373 for outputting music sounds, sound effects, etc. generated by the SPU 371.

The SPU 371 has an ADPCM (adaptive differential PCM) function for reproducing 16-bit sound data which has been encoded as 4-bit differential sound data by ADPCM, a reproducing function for reproducing the waveform data stored in the sound buffer 372 to generate sound effects, etc., and a modulating function for modulating and reproducing the waveform data stored in the sound buffer 372.

The sound system 370 can be used as a sampling sound source which generates music sounds, sound effects, etc. based on the waveform data stored in the sound buffer 372 according to commands from the CPU 351.

The optical disk controller 380 comprises an optical disk drive 381 for reproducing application programs and data recorded on an optical disk such as a CD-ROM or the like, a decoder 382 for decoding programs and data that are recorded with an error correcting code added thereto, and a buffer 383 for temporarily storing data read from the optical disk drive 381 so as to allow the data from the optical disk to be read at a high speed. An auxiliary CPU 384 is connected to the decoder 382.

Sound data recorded on the optical disk which is read by the optical disk drive 381 includes PCM data converted from analog sound signals, in addition to the ADPCM data. The ADPCM data, which is recorded as 4-bit differential data of 16-bit digital data, is decoded by the decoder 382, supplied to the SPU 371, converted thereby into analog data, and applied to drive the speaker 373. The PCM, which is recorded as 16-bit digital data, is decoded by the decoder 382 and then applied to drive the speaker 373.

The communication controller 390 comprises a communication control mechanism 391 for controlling communication with the CPU 351 via the bus 395, a controller connector 309 to which the manual controller 320 for entering instructions from the user is connected, and a pair of memory card insertion units 308A, 308B (see also FIG. 9) for receiving the memory card 500 as an auxiliary memory device for storing game settings, etc. and the portable electronic device 400, the memory card insertion units 308A, 308B being controlled by the communication control mechanism 391.

The communication controller 390 has the function of the transmitter 301b shown in FIG. 10 for sending data to and receiving data from the portable electronic device 400.

The video game apparatus 301 thus constructed can play a video game based on a game program recorded on the optical disk that is mounted in the optical disk controller 380.

In the video game apparatus 301, the CPU 351 can select one of IDs under a condition reached as the game program is executed. The selected ID is transmitted to the portable electronic device 400 by the communication controller 390.

A program which can be executed by the video game apparatus 301 may be a game program or educational software, as described above with respect to the first embodiment. With such a game program, IDs represent identification information depending on scenes or achievements in a game played by the game program as it proceeds.

As shown in FIG. 15, the portable electronic device 400 comprises a control means 441, an apparatus connection connector 442, an input means 443, a display means 444, a clock function unit 445, a nonvolatile memory 446, a speaker 447, a wireless communication means 448 and a radio reception means 449 as a data transmitting/receiving means, a battery 450, and a power supply terminal 451 and a diode 452 as a power supply means.

The control means 441 comprises a microcomputer, for example. The control means 441 has a program memory 441a disposed therein as a program storage means.

Specifically, as shown in FIG. 10, the control means 441 comprises a comparator 400a for comparing an ID which is identification information added to data transmitted by a broadcast with an ID transmitted from the video game apparatus 301, and a data selector 400b as a selective reception means for selectively receiving transmitted data based on a compared result from the comparator 400a. The comparator 400a compares an ID which is identification information added to data transmitted by a broadcast with an ID transmitted from the video game apparatus 301. The data selector 400b selectively receives transmitted data based on a compared result from the comparator 400a.

The apparatus connection connector 442 serves as a connection means for connecting to a slot of another information-handling apparatus or the like. For example, the connector 442 has a data communication function for transmitting data to and receiving data from the video game apparatus 301.

The input means 443 comprises control buttons for controlling a program stored in the program memory 441a.

The display means 444 comprises a liquid crystal display unit or the like for displaying various items of information.

The clock function unit 445 is arranged to display time on the display means 444, for example.

The nonvolatile memory 446 serves to store various data. For example, the nonvolatile memory 446 comprises a semiconductor memory such as a flash memory which is capable of retaining stored data even when the portable electronic device 400 is turned off. For example, the nonvolatile memory 446 stores received data selectively received by the data selector 400b.

Since the portable electronic device 400 has the battery 450, the nonvolatile memory 446 may comprise a static random-access memory (SRAM) capable of storing and reading data at a high speed.

The battery 450 also allows the portable electronic device 400 to be operable independently even when the portable electronic device 400 is removed from the slots 307A, 307B in the casing 302 of the video game apparatus 301.

The battery 450 comprises a chargeable secondary battery. When the portable electronic device 400 is inserted in either one of the slots 307A, 307B in the casing 302 of the video game apparatus 301, the battery 450 is supplied with electric energy from the video game apparatus 301. Specifically, the battery 450 has a terminal connected to the power supply terminal 450 via a reverse-current prevention diode 451. When the portable electronic device 400 is connected to the casing 302, electric energy is supplied from the power supply terminal 450 via the reverse-current prevention diode 451 to the battery 450.

The wireless communication means 448 is arranged to perform data communication with another memory card or the like through an infrared radiation or the like.

The radio reception means 449 has an antenna, a demodulator, etc. and is arranged to receive various data transmitted by a radio broadcast. The radio reception means 449 also has a memory for temporarily storing received data that have been broadcast. The memory and the data selector 400b of the control means 441 jointly serve as the selective reception means. The data selector 400b selectively reads data temporarily stored in the memory based on an ID thereof.

The speaker 447 is constructed as a sound generating means for generating sounds according to a program.

The above components or means of the portable electronic device 400 are connected to the control means 441, and are operated under the control of the control means 441.

Figure 16:
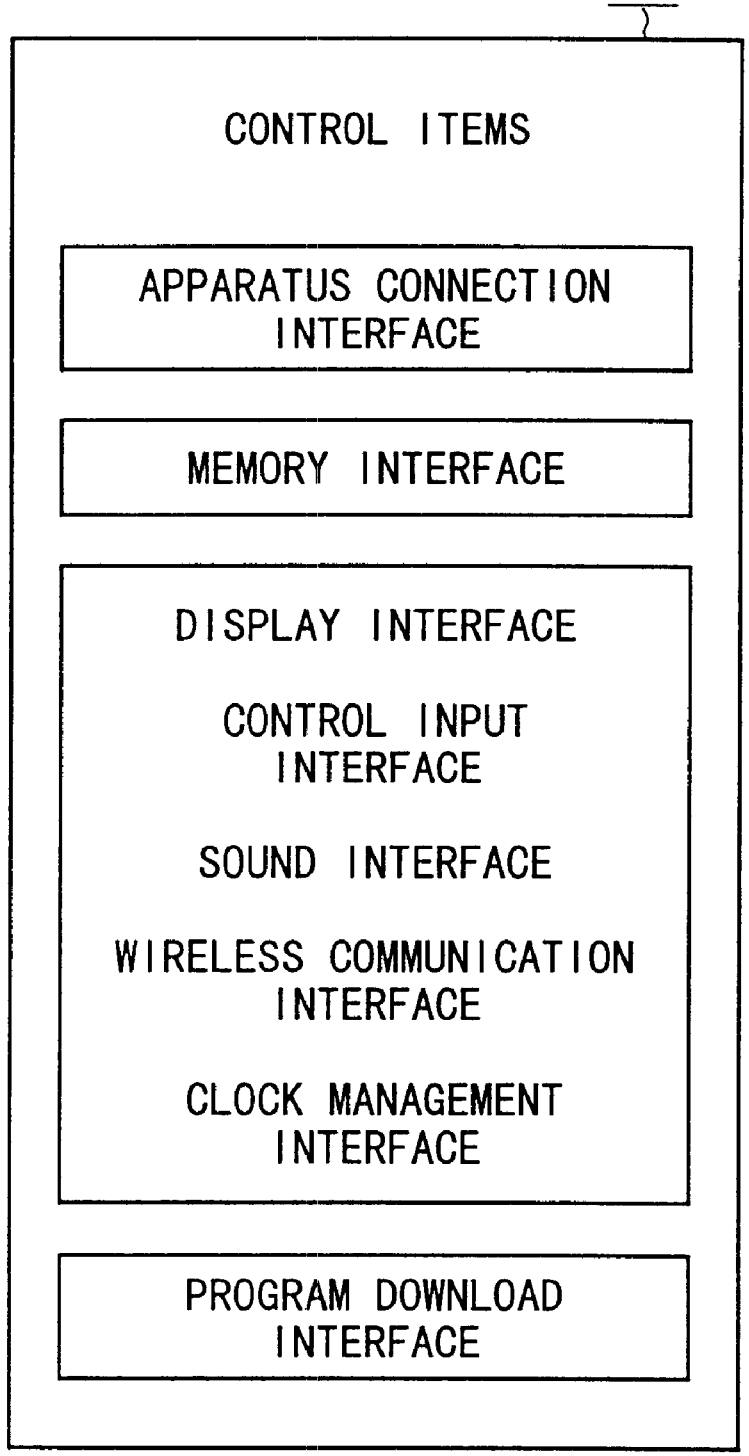
FIG. 16 is a diagram showing control items controlled by a control means in the portable electronic device shown in FIG. 15.

FIG. 16 shows control items of the control means 441. As shown in FIG. 16, the control means 441 has an apparatus connection interface for connection to an information-handling apparatus, a memory interface for outputting data to and inputting data from a memory, a display interface, a control input interface, a sound interface, wireless communication interface, a clock management interface, and a program download interface.

The portable electronic device 400, which has the input means 443 such as button switches for controlling a program to be executed and the display means 444 such as a liquid crystal display (LCD) unit, Also serves as a portable game device when a game application is executed.

The portable electronic device 400 has a function to download an application program from the video game apparatus 301 and store the downloaded application program into the program memory 441a in the microcomputer 441. With such a function, it is possible to change application programs and various driver software that operate on the portable electronic device 400.

The radio reception means 449 receives transmitted data broadcast from the broadcasting station 2, and the comparator 400a compares the ID added to the received data with the ID transmitted from the video game apparatus 301. The data receiver 400b selectively receives the data received by the radio reception means 449 based on a compared result from the comparator 400a. Thus, the portable electronic device 400 can selectively receive the data with the ID which agrees with the ID transmitted from the video game apparatus 301. Then, the portable electronic device 400 transmits the selectively received data to the video game apparatus 301 via the apparatus connection connector 422 which serves as a transmitting means.

The video game apparatus 301 and the portable electronic device 400 jointly make up the video entertainment system. The portable electronic device 400 receives data corresponding to an ID obtained under a condition reached as the program is reproduced by the video game apparatus 301, and the video game apparatus 301 receives the data which the portable electronic device 400 has selectively received based on the ID. Therefore, the video game apparatus 301 acquires new data when a certain condition is achieved as the program is executed. Specifically, the video game apparatus 301 receives data for proceeding to a new stage based on an ID acquired when a stage is cleared.

In the video entertainment system, the portable electronic device 400 itself can use the data which the portable electronic device 400 has selectively received based on the ID. Specifically, the portable electronic device 400 can reflect the data selectively received thereby in the game program which is being executed, e.g., use the data as data for proceeding to a next stage.

The video game apparatus 301 is not limited in operation to the reproduction of data recorded in the recording medium, but can download a game program via a communication link and play back the downloaded game program.

The information reproducing apparatus 3 and the portable information communication terminal 4 in the broadcasting system according to the first embodiment may be arranged in the same manner as the video game apparatus 301 and the portable electronic device 400 according to the second embodiment. In such a modification, the functions to acquire an ID as the program is executed and to selectively receive data based on the ID are not changed, but other functions are changed to determine the arrangements of the information reproducing apparatus 3 and the portable information communication terminal 4.

An apparatus for processing information according to the present invention comprises an identification information output means for outputting identification information under a condition reached as a program is executed, a comparing means for comparing identification information added to transmitted data which has been broadcast with the identification information outputted by the identification information output means, and a selective reception means for selectively receiving the transmitted data based on a compared result from the comparing means. Therefore, the comparing means compares the identification information outputted by the identification information output means and the identification information added to the transmitted data with each other, and the selective reception means selectively receives the transmitted data with the identification information added thereto based on the compared result from the comparing means.

The apparatus for processing information can thus receive transmitted data corresponding to a condition which is reached as the program is executed. The apparatus for processing information is therefore capable of receiving highly real-time data.

A method of processing information according to the present invention comprises the steps of outputting identification information under a condition reached as a program is executed, comparing identification information added to transmitted data which has been broadcast with the outputted identification information, and selectively receiving the transmitted data based on a compared result. Therefore, the outputted identification information and the identification information added to the transmitted data are compared with each other, and the transmitted data with the identification information added thereto is selectively received based on the compared result.

The method of processing information can thus receive transmitted data corresponding to a condition which is reached as the program is executed. The method of processing information is therefore capable of receiving highly real-time data.

A system for processing information according to the present invention has a first data processing means and a second data processing means. The first data processing means comprises an identification information output means for outputting identification information under a condition reached as a program is executed, and a transmitting means for transmitting the identification information outputted by the identification information output means to the second data processing means. The second data processing means comprises a comparing means for comparing identification information added to transmitted data which has been broadcast with the identification information outputted by the identification information output means, and a selective reception means for selectively receiving the transmitted data based on a compared result from the comparing means. Therefore, in the first data processing means, the identification information output means outputs identification information under a condition reached as a program is executed, and the transmitting means transmits the identification information to the second data processing means. In the second data processing means, the comparing means compares the identification information transmitted from the first data processing means and the identification information added to the transmitted data with each other, and the selective reception means selectively receives the transmitted data with the identification information added thereto based on the compared result from the comparing means.

The system for processing information can thus receive transmitted data corresponding to a condition which is reached as the program is executed. The system for processing information is therefore capable of receiving highly real-time data.

In a method of processing information according to the present invention, a second data processing means selectively receives transmitted data based on a result of comparison between identification information acquired under a condition reached as a program is executed by a first data processing means and identification information added to transmitted data which has been broadcast, for thereby receiving the transmitted data corresponding to the condition reached as the program is executed. The method of processing information makes it possible to receive highly real-time data.

An apparatus for processing information according to the present invention comprises an identification information output means for outputting identification information under a condition reached as a program is executed, and a transmitting means for transmitting the identification information outputted by the identification information output means to a data reception terminal which is connected to an external apparatus, for receiving transmitted data which has been broadcast with identification information added thereto. Therefore, the transmitting means can transmit the identification information outputted by the identification information output means to the data reception terminal.

The data reception terminal is thus capable of receiving transmitted data corresponding to a condition reached as a program is executed. Thus, the apparatus for processing information can receive the transmitted data corresponding to the condition reached as the program is executed. The apparatus for processing information makes it possible to receive highly real-time data.

A method of processing information according to the present invention comprises the steps of outputting identification information under a condition reached as a program is executed, and transmitting the outputted identification information to a data reception terminal which receives transmitted data which has been broadcast with identification information added thereto. Therefore, the outputted identification information can be transmitted to the data reception terminal.

The data reception terminal is thus capable of receiving transmitted data corresponding to a condition reached as a program is executed. Thus, the method of processing information makes it possible to receive the transmitted data corresponding to the condition reached as the program is executed. The method of processing information makes it possible to receive highly real-time data.

A data reception terminal according to the present invention comprises a reception means for receiving transmitted data which has been broadcast, a comparing means for comparing identification information acquired by an information processing apparatus under a condition as a program is executed, with identification information added to the transmitted data, and a selective reception means for selectively receiving the transmitted data based on a compared result from the comparing means. Therefore, the comparing means compares the identification information acquired by the information processing apparatus under the condition as the program is executed, with the identification information added to the transmitted data, and the selective reception means selectively receives the transmitted data with the identification information added thereto based on the compared result from the comparing means.

The data reception terminal is thus capable of receiving transmitted data corresponding to a condition reached as a program is executed. Thus, the data reception terminal makes it possible to receive highly real-time data.

In a method of receiving data according to the present invention, transmitted data which has been broadcast is selectively received on the basis of a result of comparison between identification information acquired by an information processing apparatus under a condition as a program is executed and identification information added to the transmitted data which has been broadcast, so that the transmitted data corresponding to the condition as the program is executed can be received.

The method of receiving data makes it possible to receive the transmitted data corresponding to the condition reached as the program is executed. The method of processing information makes it possible to receive highly real-time data.

A data broadcasting system according to the present invention has a data broadcasting apparatus comprising identification information managing means for managing identification information added to data, and a broadcasting means for broadcasting data to which identification information has been added by the identification information managing means. The data broadcasting system also has an information processing apparatus comprising an identification information output means for outputting identification information under a condition reached as a program is executed, a comparing means for comparing the identification information added to transmitted data which has been broadcast with the identification information outputted by the identification information output means, and a selective reception means for selectively receiving the transmitted data based on a compared result from the comparing means. Therefore, in the data broadcasting apparatus, the broadcasting means can broadcast the data to which identification information has been added by the identification information managing means. In the information processing apparatus, the comparing means compares identification information outputted by the identification information output means with data transmitted from the data broadcasting apparatus, and the selective reception means selectively receives transmitted data with the identification information added thereto based on the compared result from the comparing means.

The data broadcasting system can thus transmit and receive data corresponding to the condition reached as the program is executed. The data broadcasting system makes it possible to receive highly real-time data.

Although certain preferred embodiments of the present invention have been shown and described in detail, it should be understood that various changes and modifications may be made therein without departing from the scope of the appended claims.

What is claimed is:

1. An apparatus for processing information, comprising:
   identification information output means for outputting identification information under a condition reached as a program is executed, wherein the identification information indicates a status of execution of the program;
   comparing means for comparing identification information added to transmitted data which has been broadcast with the identification information outputted by said identification information output means; and
   selective reception means for selectively receiving the transmitted data based on a compared result from said comparing means.

2. An apparatus according to claim 1, wherein said program comprises a game program for executing a video game, said identification information output means comprising means for outputting the identification information depending on a status change in the execution of the video game.

3. An apparatus according to claim 1, further comprising means for reflecting the transmitted data selectively received by said selective reception means in the program which is executed.

4. An apparatus according to claim 1, wherein said identification information output means comprises means for selecting and outputting one of a plurality of items of identification information added to said program.

5. An apparatus according to claim 1, further comprising a recording medium with said program recorded therein.

6. A method of processing information, comprising the steps of:
   outputting identification information under a condition reached as a program is executed, wherein the identification information indicates a status of execution of the program;
   comparing identification information added to transmitted data which has been broadcast with the identification information outputted by said identification information output means; and
   selectively receiving the transmitted data based on a compared result.

7. A system for processing data, comprising first data processing means for processing data and second data processing means removably attached to said first data processing means, for performing data communications with said first data processing means, said first data processing means comprising identification information output means for outputting identification information under a condition reached as a program is executed, and transmitting means for transmitting the identification information outputted by said identification information output means to said second data processing means, said second data processing means comprising comparing means for comparing identification information added to transmitted data which has been broadcast with the identification information transmitted from said first data processing means, and selective reception means for selectively receiving the transmitted data based on a compared result from said comparing means;
   wherein the identification information indicates a status of execution of the program.

8. A system according to claim 7, wherein said second data processing means comprises transmitting means for transmitting the transmitted data selectively received by said selective reception means to said first data processing means.

9. A system according to claim 7, wherein said program comprises a game program for executing a video game, said identification information output means comprising means for outputting the identification information depending on a status change in the execution of the video game.

10. A system according to claim 7, further comprising means for reflecting the transmitted data selectively received by said selective reception means in the program which is executed.

11. A system according to claim 7, wherein said identification information output means comprises means for selecting and outputting one of a plurality of items of identification information added to said program.

12. A system according to claim 7, further comprising a recording medium with said program recorded therein.

13. A method of processing information in a data processing system having first data processing means for processing data and second data processing means removably attached to said first data processing means, for performing data combinations with said first data processing means, comprising the step of:

selectively receiving, with said second data processing means, transmitted data which has been broadcast based on a result of comparison between identification information acquired under a condition reached as a program is executed by a first data processing means and identification information added to the transmitted data which has been broadcasts;

wherein the identification information indicates a status of execution of the program.

14. A method according to claim 13, further comprising the step of transmitting the transmitted data which has been selectively received from said second data processing means to said first data processing means.

15. An apparatus for processing information, comprising:

identification information output means for outputting identification information under a condition reached as a program is executed, wherein the identification information indicates a status of execution of the program; and transmitting means for transmitting the identification information outputted by said identification information output means to a data reception terminal which is connected to an external apparatus, for receiving transmitted data which has been broadcast with identification information added thereto.

16. An apparatus according to claim 15, comprising means for acquiring transmitted data selectively received by said data reception terminal based on a result of comparison between the identification information outputted by said identification information output means and the identification information added to the transmitted data which has been broadcast.

17. An apparatus according to claim 15, wherein said program comprises a game program for executing a video game, said identification information output means comprising means for outputting the identification information depending on a status change in the execution of the video game.

18. An apparatus according to claim 15, further comprising means for reflecting the transmitted data selectively received by said selective reception means in the program which is executed.

19. An apparatus according to claim 15, wherein said identification information output means comprises means for selecting and outputting one of a plurality of items of identification information added to said program.

20. An apparatus according to claim 15, further comprising a recording medium with said program recorded therein.

21. A method of processing information, comprising the steps of:

outputting identification information under a condition reached as a program is executed, wherein the identification information indicates a status of execution of the program; and transmitting the outputted identification information to a data reception terminal which is connected to an external apparatus, for receiving transmitted data which has been broadcast with identification information added thereto.

22. A data reception terminal removably attached to an information processing apparatus for data communications with the information processing apparatus, comprising:

reception means for receiving transmitted data which has been broadcast;

comparing means for comparing identification information acquired under a condition as a program is executed by the information processing apparatus, with identification information added to the transmitted data; and selective reception means for selectively receiving the transmitted data based on a compared result from said comparing means;

wherein the identification information indicates a status of execution of the program.

23. A data reception terminal according to claim 22, further comprising transmitting means for transmitting the transmitted data selectively received by said selective reception means to said information processing apparatus.

24. A method of receiving data with a data reception terminal removably attached to an information processing apparatus for data communications with the information processing apparatus, comprising the step of:

selectively receiving transmitted data based on a result of comparison between identification information acquired under a condition as a program is executed by an information processing apparatus and identification information added to the transmitted data which has been broadcast;

wherein the identification information indicates a status of execution of the program.

25. A data broadcasting system comprising:

a data broadcasting system apparatus comprising identification information managing means for managing identification information added to data, and broadcasting means for broadcasting data to which identification information has been added by said identification information managing means; and an information processing apparatus comprising identification information output means for outputting identification information under a condition reached as a program is executed, comparing means for comparing the identification information added to transmitted data which has been broadcast with the identification information output means, and selective reception means for selectively receiving the transmitted data based on a compared result from said comparing means;

wherein the identification information indicates a status of execution of the program.

26. A data broadcasting system according to claim 25, wherein said program comprises a game program for executing a video game, said identification information output means comprising means for outputting the identification information depending on a status change in the execution of the video game.

27. A data broadcasting system according to claim 25, further comprising means for reflecting the transmitted data selectively received by said selective reception means in the program which is executed.

28. A data broadcasting system according to claim 25, wherein said identification information output means comprises means for selecting and outputting one of a plurality of items of identification information added to said program.

29. A data broadcasting system according to claim 25, further comprising a recording medium with said program recorded therein.

* * * * *